United States Patent [19]
Araki et al.

[11] Patent Number: 5,850,735
[45] Date of Patent: Dec. 22, 1998

[54] METHOD FOR PURIFYING EXHAUST GAS OF AN INTERNAL COMBUSTION ENGINE

[75] Inventors: Yasushi Araki; Tatsuji Mizuno, both of Susono; Toshiaki Tanaka, Numazu, all of Japan

[73] Assignee: Toyota Jidosha Kabushiki Kaisha, Toyota, Japan

[21] Appl. No.: 711,597

[22] Filed: Sep. 10, 1996

[30] Foreign Application Priority Data

Sep. 11, 1995 [JP] Japan ...................................... 7-232695
Nov. 30, 1995 [JP] Japan ...................................... 7-312770
Dec. 13, 1995 [JP] Japan ...................................... 7-324539

[51] Int. Cl.$^6$ .............................. F01N 3/02; F01N 3/08; F01N 3/36
[52] U.S. Cl. .............................. 60/274; 60/286; 60/297; 60/301; 60/311
[58] Field of Search ............................ 60/274, 276, 285, 60/286, 297, 301, 303, 311

[56] References Cited

FOREIGN PATENT DOCUMENTS

| 625-633-A1 | 12/1993 | European Pat. Off. . |
| 580-389-A1 | 1/1994 | European Pat. Off. . |
| 613-714-A2 | 9/1994 | European Pat. Off. . |
| 636-770-A1 | 2/1995 | European Pat. Off. . |
| 53-38815 | 4/1978 | Japan . |

OTHER PUBLICATIONS

"Patent Abstracts of Japan", vol. 17, No. 400 (C–1089), abstract of JP–5–076771, Jul. 1993.
"Patent Abstracts of Japan", vol. 12, No. 409 (M–758), abstract of JP–63–150441, Oct. 1988.
"Patent Abstracts of Japan", vol. 14, No. 395 (M–1016), abstract of JP–2–149715, Aug. 1990.

Primary Examiner—Tony M. Argenbright
Attorney, Agent, or Firm—Oliff & Berridge, PLC

[57] ABSTRACT

According to the present invention, $SO_X$ in the exhaust gas of an internal combustion engine is absorbed by a sulfate absorbent which absorbs $SO_X$ in the exhaust gas when the temperature is lower than a releasing temperature and releases the absorbed $SO_X$ when the temperature becomes higher than the releasing temperature. When the exhaust gas temperature increases during the operation of the engine and reaches the releasing temperature, the temperature of the exhaust gas flowing into the sulfate absorbent is further raised to a predetermined temperature by supplying fuel to the exhaust gas passage upstream of the sulfate absorbent. The ratio of $SO_3$ in the $SO_X$ mixture released from the sulfate absorbent changes in accordance with the temperature, and takes the highest value at a certain temperature (i.e., a peak temperature). Therefore, when the exhaust gas temperature is raised above the peak temperature, the ratio of $SO_3$ in the $SO_X$ mixture released from the sulfate absorbent decreases as the temperature increases. In the present invention, the above-noted predetermined temperature is selected in such a manner that the ratio of $SO_3$ at this predetermined temperature becomes lower than the ratio of $SO_3$ at the releasing temperature. Therefore, when $SO_X$ is released from the sulfate absorbent, the amount of $SO_3$, i.e., the amount of particulate matter released into the atmosphere can be maintained at a low level.

12 Claims, 14 Drawing Sheets

METHOD FOR PURIFYING EXHAUST GAS OF AN INTERNAL COMBUSTION ENGINE

BACKGROUND OF THE INVENTION

1. Field of the Invention

The present invention relates to a method for purifying the exhaust gas of an internal combustion engine. More specifically, the present invention relates to a method for purifying the exhaust gas of an internal combustion engine which is capable of reducing the amount of particulate matter released into the atmosphere.

2. Description of the Related Art

In the exhaust gas from an internal combustion engine, especially from a diesel engine, particulate matter such as soot (carbon particles) and SOF (Soluble Organic Fractions) are contained. To prevent particulate matter in the exhaust gas from diffusing into the atmosphere, usually an oxidizing catalyst and a DPF (diesel particulate filter) are used.

SOF in the exhaust gas is mainly composed of hydrocarbons, and can be oxidized to $H_2O$ and $CO_2$ by contacting the exhaust gas with an oxidizing catalyst. Soot can be collected by a DPF and removed from the exhaust gas.

When an oxidizing catalyst and a DPF are disposed in the exhaust gas passage of an engine in this order from the upstream side, oxidation of SOF and the collection of soot can be performed at the same time.

However, when SOF is oxidized by an oxidizing catalyst, a problem occurs. Usually, fuel for the engine, especially, diesel fuel, contains a sulfur component. This sulfur is burned in the engine and produces sulfur dioxide ($SO_2$) in the exhaust gas of the engine. When the exhaust gas is supplied to an oxidizing catalyst, $SO_2$, as well as SOF, is oxidized by the oxidizing catalyst and forms sulfur trioxide ($SO_3$). Therefore, the exhaust gas flows out from the oxidizing catalyst contains $SO_3$. $SO_3$ in the exhaust gas is not collected by the DPF, and released into the atmosphere. Since $SO_3$ is detected as particulate matter, the total amount of particulate matter in the exhaust gas increases in some cases due to $SO_3$ produced by the oxidizing catalyst even though SOF and soot are removed from the exhaust gas.

Japanese Unexamined Patent Publication (Kokai) No. 53-38815 discloses a method for solving the above problem using a sulfate trap.

The sulfate trap used in the '815 publication is capable of absorbing $SO_X$ (in this specification, sulfur oxide such as $SO_2$ and $SO_3$ are referred to as $SO_X$ in general) and holding it in the trap in the form of a sulfate.

The device in the '815 publication disposes the sulfate trap in the exhaust gas passage of an internal combustion engine downstream of the oxidizing catalyst to absorb $SO_X$ in the exhaust gas. Thus, $SO_2$ passes through the oxidizing catalyst without being oxidized and $SO_3$ formed by the oxidation of $SO_2$ on the oxidizing catalyst are absorbed by the sulfate trap and, thereby, the amount of particulate matter released into the atmosphere can be kept small. However, sulfate formed in the sulfate trap starts to decompose when the temperature of the sulfate trap exceeds a certain value. In this case, since most of the sulfur oxide absorbed in the sulfate trap is released in the form of $SO_3$, if the temperature of the sulfate trap exceeds the certain temperature, the amount of the particulate matter released into the atmosphere increases. In this specification, the temperature at which the releasing of the absorbed sulfur oxide occurs is referred to as the "releasing temperature".

To prevent the releasing of $SO_3$ from occurring, the device in the '815 publication supplies cooling air to the sulfate trap to keep the temperature of the sulfate trap lower than the releasing temperature.

However, problems may arise in the device of the '815 publication. Since sulfur oxide absorbed in the sulfate trap is never released in the device of the '815 publication, sulfur oxide continues to accumulate in the sulfate trap, and the sulfate trap is saturated with the absorbed sulfur oxide after the engine has operated for a long time. When the sulfate trap saturates with sulfur oxide, it cannot absorb $SO_X$ in the exhaust gas. Therefore, $SO_3$ produced by the oxidizing catalyst passes through the sulfate trap without being absorbed after the engine has operated for a certain period and, thereby, the amount of the particulate matter released into the atmosphere increases.

In the device of the '815 publication, the accumulation of sulfur oxide in the sulfate trap can be prevented if the temperature of the sulfate trap is raised to the releasing temperature periodically before the sulfate trap is saturated with sulfur oxide. However, most of the absorbed sulfur oxide is released from the sulfate trap in the form of $SO_3$ near the releasing temperature. Therefore, if the temperature of the sulfate trap is raised to the releasing temperature to prevent the saturation thereof, most of the sulfur oxide absorbed during the engine operation is released in the form of $SO_3$, and the total amount of the particulate matter released into the atmosphere increases.

SUMMARY OF THE INVENTION

In view of the problems in the related art as set forth above, the object of the present invention is to provide a method for purifying the exhaust gas of an internal combustion engine which is capable of reducing the amount of the particulate matter released into the atmosphere even after a long period of engine operation.

This object is achieved by a method, for purifying the exhaust gas of an internal combustion engine, which comprises a step for contacting the exhaust gas of an internal combustion engine containing sulfur oxide with a sulfate absorbent at a temperature lower than a releasing temperature and a step for raising the temperature of the sulfate absorbent after it has absorbed sulfur oxide to a predetermined temperature higher than the releasing temperature to, thereby, cause the sulfate absorbent to release the absorbed sulfur oxide. The sulfate absorbent absorbs sulfur oxide in the exhaust gas when the temperature is lower than the releasing temperature and releases the absorbed sulfur oxide when the temperature becomes higher than the releasing temperature. The predetermined temperature to which the sulfate absorbent is heated is selected in such a manner that the ratio of the sulfur trioxide component in the sulfur oxide mixture released from the sulfate absorbent at this predetermined temperature is lower than the ratio of the sulfur trioxide in the sulfur oxide mixture released from the sulfate absorbent at the releasing temperature.

According to this aspect of the invention, the amount of $SO_3$ in the sulfur oxide mixture released from the sulfate absorbent is reduced by raising the temperature of the sulfate absorbent to a predetermined temperature higher than the releasing temperature. The ratio between the amounts of $SO_3$ and $SO_2$ in the sulfur oxide released from the sulfate absorbent is determined by the temperature of the sulfate absorbent provided the oxygen concentration is unchanged. The ratio of the $SO_3$ component in the sulfur oxide mixture released from the sulfate absorbent increases as the temperature of the sulfate increases from the releasing temperature, and reaches a peak value at a certain temperature ("a peak temperature") which is higher than the releasing temperature. If the temperature further increases from the peak temperature, the ratio of $SO_3$ decreases as the temperature increases. In this aspect of the invention, the predetermined temperature to which the sulfate absorbent is heated to cause the releasing of sulfur oxide is higher than the peak temperature. Further, the predetermined temperature is selected in such a manner that the ratio of $SO_3$ in the sulfur mixture oxide released from sulfate absorbent at this temperature is smaller than the ratio of $SO_3$ in the sulfur oxide mixture released at the releasing temperature. Therefore, in this aspect of the invention, even if the releasing of sulfur oxide is required to prevent the saturation of the sulfate absorbent, the amount of $SO_3$ released from the sulfate absorbent can be reduced.

According to another aspect of the invention, there is provided a method for purifying the exhaust gas of an internal combustion engine comprising, a step for contacting the exhaust gas of an internal combustion engine containing sulfur oxide with a sulfate absorbent at a temperature lower than a releasing temperature, a step for determining whether the temperature of the sulfate absorbent reaches the releasing temperature, and a step for lowering the concentration of oxygen in the exhaust gas when it is determined that the temperature of the sulfate absorbent has reached the releasing temperature to thereby cause the sulfate absorbent to release the absorbed sulfur oxide. The sulfate absorbent absorbs sulfur oxide in the exhaust gas when the temperature is lower than the releasing temperature and releases the absorbed sulfur oxide when the temperature becomes higher than the releasing temperature or when the concentration of oxygen in the exhaust gas becomes low.

Since the maximum amount of sulfur oxide that the sulfate absorbent can hold increases as the concentration of oxygen in the exhaust gas increases, when the concentration of oxygen in the exhaust gas becomes low, sulfur oxide is released from the sulfate absorbent even though the temperature is the same. Further, the ratio of $SO_3$ in the released sulfur oxide becomes smaller as the concentration of oxygen in the exhaust gas becomes low. In this aspect of the invention, when the temperature of the sulfate absorbent reaches the releasing temperature, i.e., when the releasing of sulfur oxide starts due to a temperature rise of the sulfate absorbent, the concentration of oxygen in the exhaust gas is lowered. This causes the sulfate absorbent to release the absorbed sulfur oxide at higher rate. Further, since the concentration of oxygen is low, the ratio of $SO_3$ in the released sulfur oxide becomes lower. Therefore, in this aspect of the invention, even if the releasing of sulfur oxide occurs, the amount of $SO_3$ released from the sulfate absorbent, i.e., the amount of particulate matter released into the atmosphere can be reduced.

According to another aspect of the invention, there is provided a method for purifying the exhaust gas of an internal combustion engine comprising, a step for contacting the exhaust gas of an internal combustion engine containing sulfur oxide with a sulfate absorbent, a step for determining whether the amount of sulfur oxide absorbed by the sulfate absorbent reaches a predetermined value, and a step for lowering the concentration of oxygen in the exhaust gas when it is determined that the amount of the sulfur oxide absorbed by the sulfate absorbent has reached the predetermined value to, thereby cause the sulfate absorbent to release the absorbed sulfur oxide. The sulfate absorbent absorbs sulfur oxide in the exhaust gas and releases the absorbed sulfur oxide when the concentration of oxygen in the exhaust gas becomes low.

In this aspect of the invention, the concentration of oxygen in the exhaust gas is lowered in order to cause the sulfate absorbent to release the sulfur oxide when the amount of sulfur oxide absorbed by the sulfate absorbent reaches a predetermined value. Therefore, the amount of the sulfur oxide held in the sulfate absorbent is always kept lower than the predetermined value, and the sulfate absorbent is prevented from being saturated with the absorbed sulfur oxide. Further, since the concentration of oxygen in the exhaust gas is low, the ratio of $SO_3$ in the released sulfur oxide becomes lower, and the amount of particulate matter released into the atmosphere becomes low even though the releasing of sulfur oxide from the sulfate absorbent occurs.

According to another aspect of the invention, there is provided a method for purifying the exhaust gas of an internal combustion engine containing soot and sulfur oxide comprising, a step for collecting soot in the exhaust gas of an internal combustion engine, a step for contacting the exhaust gas after collecting soot with a sulfate absorbent at a temperature lower than a releasing temperature, a step for burning the collected soot, and a step for supplying the combustion exhaust gas generated by the combustion of the soot to the sulfate absorbent to cause the sulfate absorbent to release the absorbed sulfur oxide. The sulfate absorbent absorbs sulfur oxide in the exhaust gas when the temperature is lower than the releasing temperature and releases the absorbed sulfur oxide when the temperature becomes higher than the releasing temperature.

In this aspect of the invention, a hot exhaust gas of low oxygen concentration produced by the combustion of the collected soot is supplied to the sulfate absorbent when releasing of the sulfur oxide from the sulfate absorbent is required. Since the hot exhaust gas is supplied to the sulfate absorbent, the sulfate absorbent is heated to its releasing temperature and, thereby the sulfur oxide is released from the sulfate absorbent. Further, since the concentration of oxygen in the combustion gas is low, the ratio of $SO_3$ in the released sulfur oxide becomes low. Therefore, the amount of particulate matter released into the atmosphere becomes low even though the releasing of sulfur oxide from the sulfate absorbent occurs.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
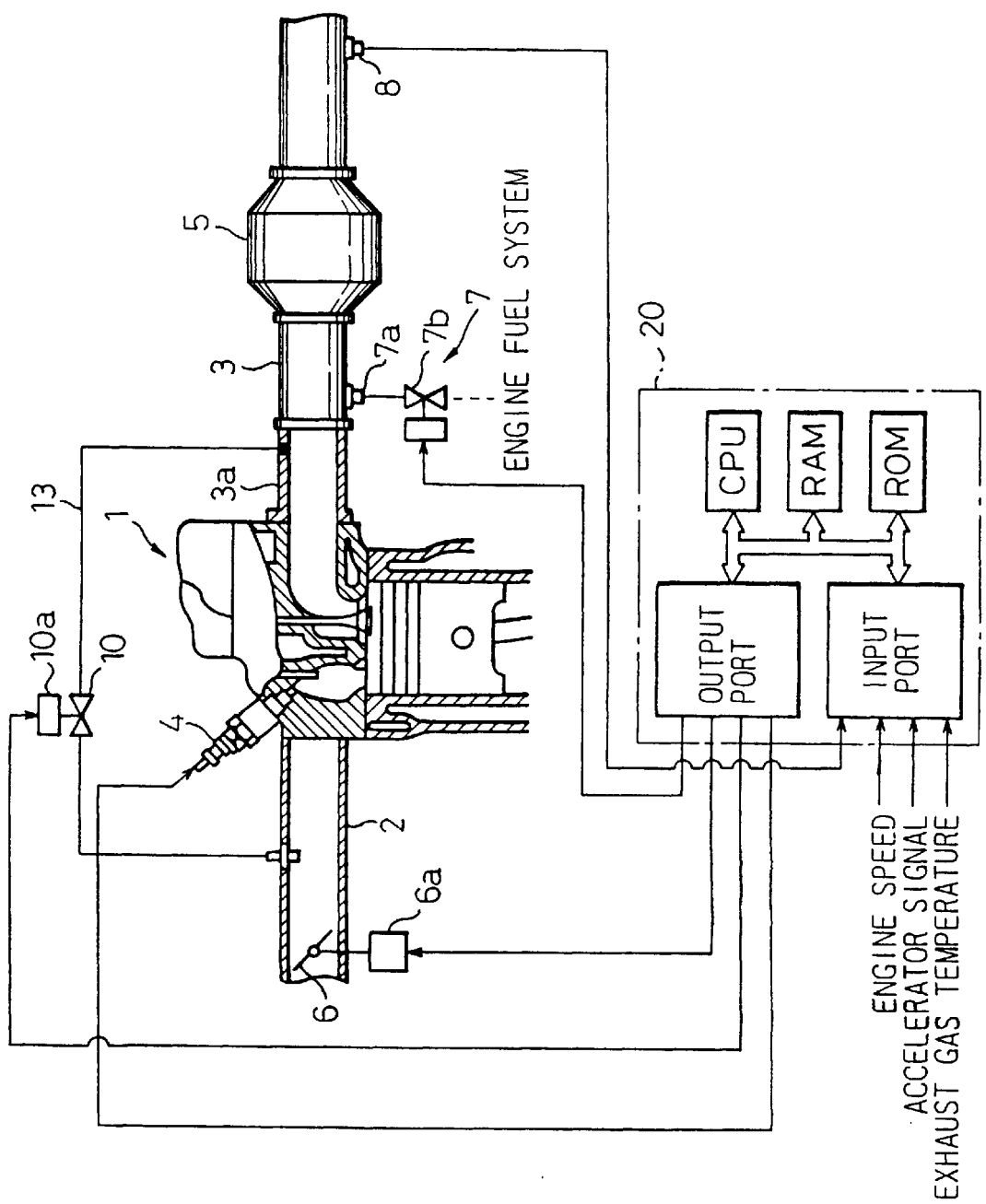
FIG. 1 schematically illustrates an embodiment of a device for conducting the method in the present invention when applied to an internal combustion engine for an automobile.

FIG. 1 shows an embodiment of an exhaust gas purification device for applying the exhaust gas purifying method of the present invention to a diesel engine for an automobile.

In FIG. 1, reference numeral 1 designates a diesel engine for an automobile. Though a multiple cylinder diesel engine is used in this embodiment, FIG. 1 shows one cylinder only. Numeral 2 is an intake air passage connected to the inlet port of the respective cylinder. Numeral 3 is an exhaust gas passage which is connected to the exhaust port of the respective cylinder via an exhaust manifold 3a. A fuel injection valve 4, which injects pressurized fuel into a combustion chamber, is provided on each of the cylinders.

In this embodiment, an intake shutter valve 6 is disposed in the intake air passage 2. The intake shutter valve 6 is a type, such as a butterfly valve, which generates low flow resistance when open, and is normally used for throttling the intake air passage 2 to reduce the amount of intake air during an idle operation of the engine 1 to increase the stability of the engine operation. In FIG. 1, numeral 6a is an actuator of appropriate type, such as a vacuum actuator or solenoid actuator, which opens and closes the intake shutter valve 6 in accordance with a control signal supplied by an ECU 20.

In this embodiment, an EGR passage 13 which connects the exhaust manifold 3a and the intake air passage 2 is provided to feed a portion of exhaust gas discharged from the engine to the intake air passage 2. On the EGR passage 13, an EGR control valve 10 is disposed which controls the amount of the exhaust gas flowing through the EGR passage 13. The EGR control valve 10 is provided with an actuator 10a of appropriate type, such as a vacuum actuator, stepper motor, or solenoid actuator. The actuator 10a drives the EGR control valve 13 and adjusts the degree of opening of the valve 13 in response to a control signal from the ECU 20.

In this embodiment, a secondary fuel supply unit 7 for injecting fuel into the exhaust gas passage 3 is provided. The secondary fuel supply unit 7 includes a injection nozzle 7a which injects pressurized fuel from an engine fuel supply pump (not shown) into the exhaust gas passage 3, and a flow control valve 7b for controlling the amount of fuel injected into the exhaust gas passage 3 in accordance with a control signal from the ECU 20. As explained later, the secondary fuel injection unit 7 injects fuel into the exhaust gas passage 13 to increase the exhaust gas temperature and to decrease the oxygen concentration by burning the injected fuel when it is required to cause a sulfate absorbent to release the absorbed sulfur oxide.

Numeral 5 in FIG. 1 designates a sulfate absorbent disposed in the exhaust gas passage 3 downstream of the injection nozzle 7a. The sulfate absorbent 5 in this embodiment performs an absorbing and releasing operation of $SO_X$. Namely, the sulfate absorbent 5 absorbs $SO_X$ in the exhaust gas and releases the absorbed $SO_X$ when conditions for releasing are fulfilled. The sulfate absorbent 5 will be explained later in detail.

Numeral 20 in FIG. 1 is a control circuit or Electronic Control Unit (ECU) of the engine 1. The ECU 20 in this embodiment comprises, for example, a microcomputer of known type which has a CPU, RAM, ROM, and input and output ports all interconnected by a bidirectional bus. The ECU 20 performs fundamental control of engine such as fuel injection control, and, in addition to that, the ECU 20 in this embodiment performs $SO_X$ releasing control of the sulfate absorbent 5 in which $SO_X$ releasing operation of the sulfate absorbent is controlled.

To perform the above-noted control, various signals are fed to the input port of the ECU 20. These signals are, for example, an engine speed signal from an engine speed sensor disposed near the crankshaft (not shown) of the engine, an accelerator signal from an accelerator sensor disposed near an accelerator pedal (not shown) which represents the amount of depression of the accelerator pedal by the driver, an exhaust gas temperature signal from a temperature sensor 8 disposed in the exhaust gas passage 3 downstream of the sulfate absorbent 5. The output port of the ECU 20 is connected to, for example, the fuel injection valve 4, the actuator 6a of the intake shutter valve 6, the actuator 10a of the EGR control valve 10 and the flow control valve 7b of the secondary fuel supply unit 7 via the respective drive circuit (not shown) in order to control the operations of these elements.

The sulfate absorbent 5 uses a monolithic substrate made of cordierite which is similar to the substrate normally used for a conventional catalytic converter, and a layer made of a substance such as alumina ($Al_2O_3$), silica ($SiO_2$) or titania ($TiO_2$) is formed on the surface of the substrate. In this embodiment, catalytic components of precious metal such as platinum (Pt) are carried by the layer. Therefore, the sulfate absorbent 5 in this embodiment also acts as an oxidizing catalyst which oxidizes SOF (hydrocarbons) and CO in the exhaust gas to $H_2O$ and $CO_2$.

When the engine is operated on a light load, the exhaust gas temperature is low, and the hydrocarbons (HC) and CO in the exhaust gas increases. However, in this embodiment, the HC and CO components in the exhaust gas are oxidized when the exhaust gas flows through the sulfate absorbent 5 and are converted to $H_2O$ and $CO_2$ by the catalytic components carried thereon. Therefore, HC and CO are not released into the atmosphere.

Further, when the exhaust gas flows through the sulfate absorbent 5, an $SO_2$ component in the exhaust gas is also oxidized to $SO_3$ by the catalytic components. However, in this embodiment, the $SO_3$ produced by the oxidation of $SO_2$ is absorbed by the absorbent layer (such as made of alumina), and are not released into the atmosphere.

Next, the mechanism of the absorbing and releasing operation of the sulfate absorbent 5 is explained taking the case in which alumina ($Al_2O_3$) is used for the layer on the substrate, and platinum (Pt) is used as a catalyst, as an example. In this case, $SO_2$ and $SO_3$ in the exhaust gas are oxidized by $O_2^-$ or $O^{2-}$ attached on the surface of platinum and form sulfonic acid ions $SO_4^{2-}$. This sulfonic acid ions $SO_4^{2-}$ diffuse into the alumina layer while combining with alumina ($Al_2O_3$), and form sulfate $Al_2O_3(SO_4)_3$. Thus, $SO_X$ such as $SO_2$ and $SO_3$ in the exhaust gas are absorbed by, and held in the sulfate absorbent 5.

However, $SO_X$ held in the sulfate absorbent 5 in the form of sulfate $Al_2O_3(SO_4)_3$ is released from sulfate absorbent 5 when the temperature becomes high or oxygen concentration in the exhaust gas becomes low.

For example, when the temperature of the sulfate absorbent 5 increases, the sulfate $Al_2O_3(SO_4)_3$ in the alumina layer is decomposed by heat, and sulfonic acid ions $SO_4^{2-}$ are produced. Then, these sulfonic acid ions $SO_4^{2-}$ form $SO_X$ when they are released from the sulfate absorbent 5. Thus, when the temperature of the sulfate absorbent 5 becomes high, $SO_X$ is released from the sulfate absorbent 5.

Further, when the oxygen concentration in the exhaust gas becomes low, the amount of $O_2^-$ and $O^{2-}$ attached on the surface of Pt decreases. This causes reactions to proceed in the directions $SO_4^{2-} \rightarrow SO_3$ and $SO_4^{2-} \rightarrow SO_2$ on the surface of platinum. Therefore, $SO_X$ such as $SO_3$ and $SO_2$ are formed on the platinum (Pt), and sulfonic acid ions $SO_4^{2-}$ are released from the sulfate absorbent in the form of $SO_X$. The rate at which $SO_4^{2-}$ ions are released from the absorbent is determined by the difference between the concentrations of $SO_4^{2-}$ ions in the absorbent and on the surface of Pt. When the concentration of oxygen in the exhaust gas is low, the rate of the reactions in the directions $SO_4^{2-} \rightarrow SO_3$ and $SO_4^{2-} \rightarrow SO_2$ become larger and the concentration of $SO_4^{2-}$ ions on the surface of Pt becomes low. Therefore, when the oxygen concentration in the exhaust gas becomes low, $SO_4^{2-}$ ions are released from the absorbent even if the concentration of $SO_4^{2-}$ ions in the absorbent (i.e., the amount of $SO_X$ absorbed by the absorbent) is low. Thus, when the oxygen concentration in the exhaust gas becomes lower, $SO_X$ is released from the sulfate absorbent 5. Further, similarly to this, since the rate of the reactions in the directions $SO_4^{2-} \rightarrow SO_3$ and $SO_4^{2-} \rightarrow SO_2$ becomes higher as the temperature of the sulfate absorbent becomes higher, $SO_X$ is released from the sulfate absorbent 5 when the temperature of the sulfate absorbent becomes high even though the oxygen concentration in the exhaust gas is high. Namely, whether the releasing of $SO_X$ from the sulfate absorbent occurs is determined by an equilibrium condition which is ruled by the temperature and the oxygen concentration.

Figure 2:
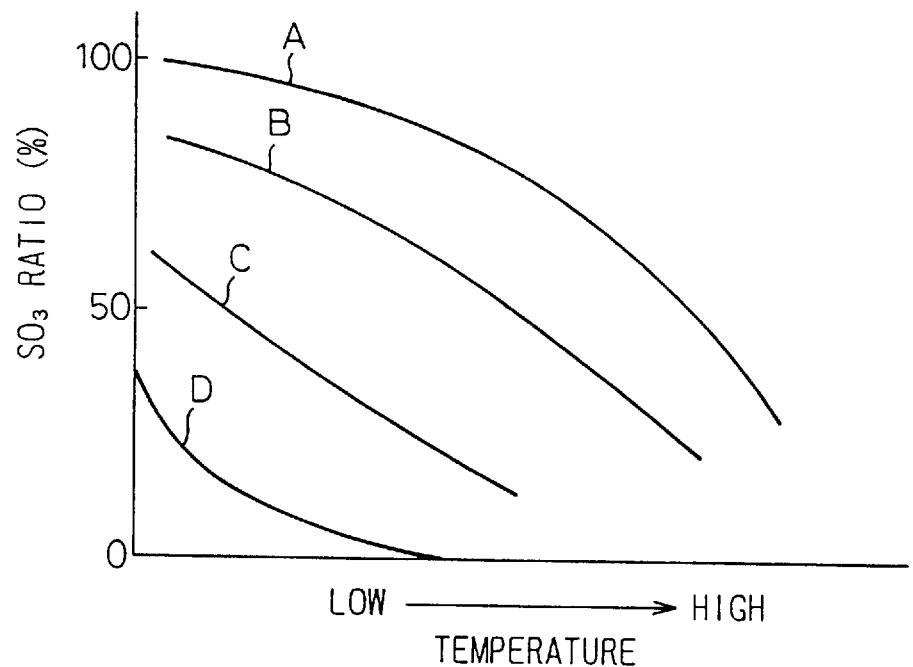
FIG. 2 is a diagram showing the change in the ratio of the $SO_3$ in the gas containing $SO_X$ mixture according to the change in the temperature and the concentration of oxygen in the gas.
Figure 3:
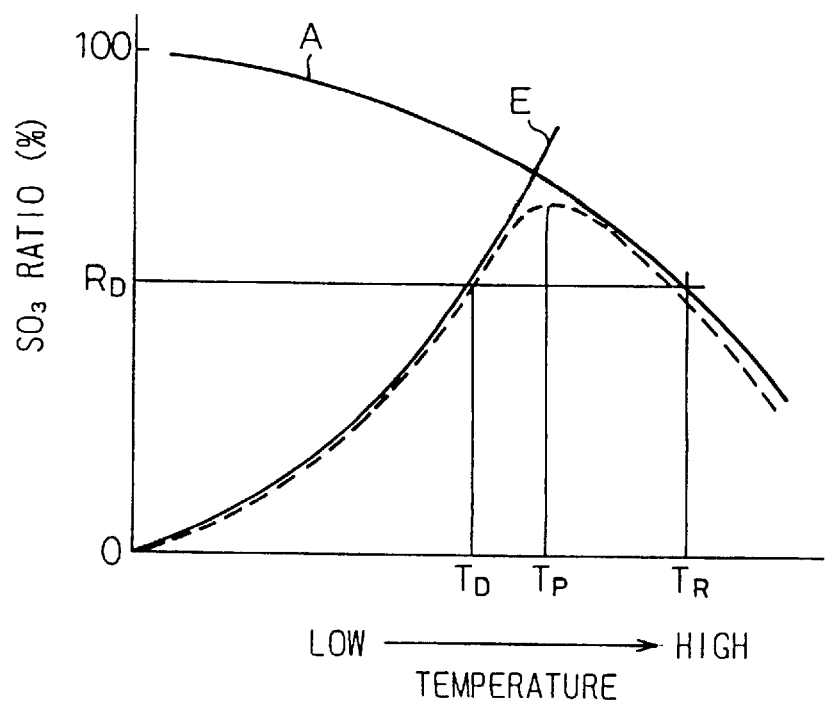
FIG. 3 is a diagram showing the change in the ratio of $SO_3$ in the $SO_X$ mixture contained in gas under the existence of an oxidizing catalyst in accordance with the change in the temperature.
Figure 4:
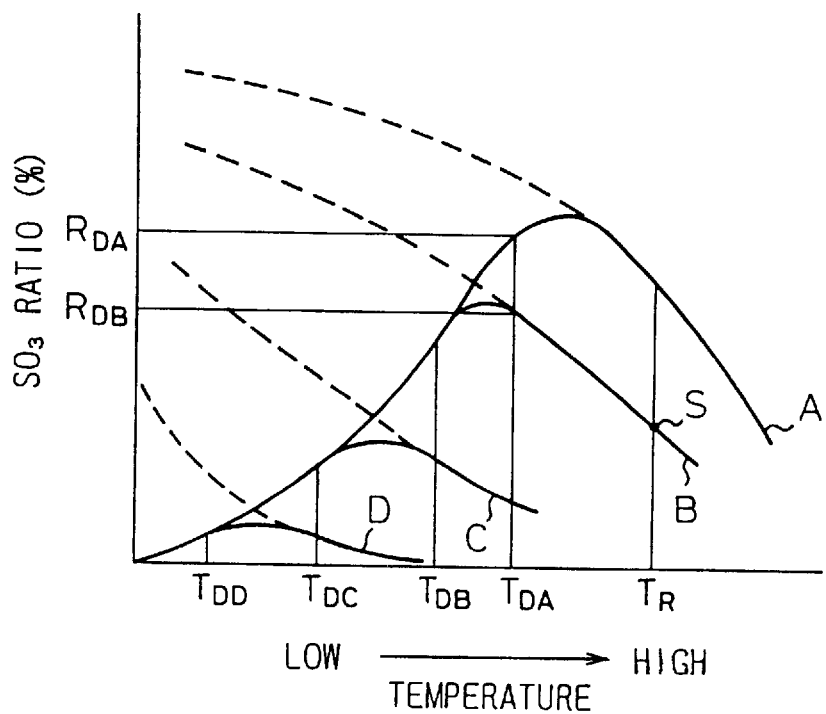
FIG. 4 is a diagram showing the change in the ratio of $SO_3$ in the $SO_X$ mixture contained in gas under the existence of an oxidizing catalyst in accordance with the change in the temperature and the concentration of oxygen.

Further, the ratio between $SO_2$ and $SO_3$ in the $SO_X$ mixture released from the sulfate absorbent is determined by the temperature of the sulfate absorbent 5 and the oxygen concentration in the exhaust gas. FIGS. 2 through 4 show the change in the ratio of $SO_3$ in the $SO_X$ mixture released from the sulfate absorbent 5 in the equilibrium condition according to the changes in the temperature and oxygen concentration.

In FIG. 2, the vertical axis represents the ratio of $SO_3$ in the $SO_X$ mixture (the mixture of $SO_2$ and $SO_3$), and the horizontal axis represents the temperature of the sulfate absorbent. The curves A through D in FIG. 2 represent the ratio of $SO_3$ in the $SO_X$ mixture in the equilibrium conditions at various oxygen concentrations, and the curve A shows the case in which the oxygen concentration is highest and the oxygen concentration becomes lower in the order from A to D. In FIG. 2, the ratio of $SO_2$ in the $SO_X$ mixture can be calculated by subtracting the ratio of $SO_3$ from 100%.

As illustrated in FIG. 2, in the equilibrium conditions, the ratio of $SO_3$ becomes lower as the temperature becomes higher if the oxygen concentration is kept constant. Further, if the temperature is kept constant, the ratio of $SO_3$ in $SO_X$ in the equilibrium condition becomes lower as the oxygen concentration becomes lower.

However, in the actual operation of the engine, almost all of the $SO_X$ in the exhaust gas from the engine is composed of $SO_2$, and the ratio of $SO_3$ in $SO_X$ is very low. Therefore, it takes a relatively long time to reach the equilibrium conditions shown in FIG. 2 in which the ratio of $SO_3$ is relatively high. When an oxidizing catalyst exists, since the oxidation of $SO_2$ is promoted, the time required for reaching the equilibrium conditions becomes shorter. However, the oxidizing ability of catalyst becomes larger as the temperature becomes higher. Therefore, when the temperature is relatively low, the ratio of $SO_3$ in the $SO_X$ mixture is determined by the oxidizing ability of the catalyst, and the ratio of $SO_3$ increases as the temperature becomes higher (i.e., the oxidizing ability of the catalyst becomes larger).

In FIG. 3, the broken line represents the change in the ratio of $SO_3$ in the actual condition when an oxidizing catalyst exists. In this case, the oxygen concentration is kept constant (for example, at the concentration corresponding to the curve A in FIG. 2). The curve E in FIG. 3 shows the change in the oxidizing ability of the catalyst in accordance with the change in the temperature, and the curve A in FIG. 3 shows the ratio of $SO_3$ in the equilibrium condition (which is the same as the curve A in FIG. 2). As illustrated in FIG. 3, the ratio of $SO_3$ in the actual condition increases along the curve E (the oxidizing ability of the catalyst) as the temperature increases, and approaches the value determined by the equilibrium (the curve A). However, the ratio of $SO_3$ cannot become larger than the value determined by the equilibrium (i.e., the curve A in FIG. 3). Therefore, when the catalyst exists, the ratio of $SO_3$ (the dotted line) increases as the temperature becomes high, and reaches the value determined by the equilibrium at a certain temperature (i.e., $T_P$ in FIG. 3), and when the temperature exceeds this temperature ($T_P$), the ratio of $SO_3$ decreases along the equilibrium curve A as the temperature increases. Namely, when the catalyst exists, there is a peak temperature ($T_P$ in FIG. 3) at which the ratio of $SO_3$ in the $SO_X$ mixture becomes the highest value.

Though FIG. 3 shows the case in which the oxygen concentration is maintained at constant value, the equilibrium curve itself changes in accordance with the oxygen concentration (for example, curves A through D in FIG. 2). FIG. 4 shows the ratio of $SO_3$ in the actual condition under the existence of the catalyst at various oxygen concentrations, and the curves A through D in FIG. 4 are the same curves as A through D in FIG. 2 which represent the ratio of $SO_3$ in equilibrium conditions at various oxygen concentrations. As illustrated in FIG. 4, the peak temperature ($T_P$ in FIG. 3) at which the ratio of $SO_3$ is the highest becomes lower as the oxygen concentration becomes lower, and the peak (the highest) value of the ratio of $SO_3$ also becomes smaller as the oxygen concentration becomes lower.

As explained before, the amount of the particulate matter released into the atmosphere becomes smaller as the amount of $SO_3$ released from the sulfate absorbent becomes smaller. Therefore, if $SO_X$ is released from the sulfate absorbent in the conditions which minimize the ratio of $SO_3$ in the released $SO_X$, the amount of the particulate matter can be reduced even if the total amount of $SO_X$ released from the sulfate absorbent is the same. In this embodiment, the amount of particulate matter is minimized by performing an $SO_X$ releasing control to minimize the ratio of $SO_3$ in the $SO_X$ released from the sulfate absorbent 5.

Next, the $SO_X$ releasing control in this embodiment is explained.

First, the case in which the oxygen concentration is kept constant is considered. In this case, the actual ratio of $SO_3$ in the released $SO_X$ is represented by the broken line in FIG. 3. Assuming that the releasing temperature is $T_D$, the releasing of $SO_X$ starts when the exhaust gas temperature becomes higher than the temperature $T_D$, for example, by the change in the operating conditions of the engine 1. Since the exhaust gas temperature is nearly the same as the temperature of the sulfate absorbent 5, the exhaust gas temperature is used instead of the temperature of the sulfate absorbent 5 in the following explanation. When $SO_X$ is released from the sulfate absorbent 5 at the releasing temperature $T_D$, the ratio of $SO_3$ in the released $SO_X$ is $R_D$ as shown in FIG. 3. To reduce the ratio of $SO_3$ to a value smaller than $R_D$, it is apparent that the exhaust gas temperature must be lowered below the releasing temperature $T_D$, or the exhaust gas temperature must be raised above the peak temperature $T_P$ so that the exhaust gas temperature exceeds the temperature $T_R$ in FIG. 3 at which the ratio of $SO_3$ becomes lower than $R_D$. However, if the temperature is lowered to below the releasing temperature $T_D$, the releasing of $SO_X$ does not occur in the actual operation. Therefore, in this embodiment, when the exhaust gas temperature becomes high and reaches the releasing temperature $T_D$, the exhaust gas temperature is further raised to the temperature $T_R$ by the method explained later to lower the ratio of $SO_3$ in the released $SO_X$ than the ratio $R_D$ at the releasing temperature $T_D$. By doing so, the amount of $SO_3$ (the particulate matter) released from the sulfate absorbent 5 can be smaller than that when the $SO_X$ is released at the releasing temperature $T_D$.

Next, consider the case in which the exhaust gas temperature is kept at the releasing temperature and not changed.

In this case, the ratio of $SO_3$ can be reduced by lowering the oxygen concentration in the exhaust gas. For example, in FIG. 4, assume that the oxygen concentration in the exhaust gas is on curve A (i.e., oxygen concentration same as that of curve A in FIG. 3). As explained before, the releasing of $SO_X$ from the sulfate absorbent 5 starts when the temperature of the exhaust gas increases to the releasing temperature $T_{DA}$, and the ratio of $SO_3$ in the released $SO_X$ becomes $R_{DA}$ in FIG. 4. In this case, instead of raising the exhaust gas temperature, the oxygen concentration in the exhaust gas may be lowered, for example, to the value corresponding to the curve B in FIG. 4. Since the equilibrium shifts from the curve A to the curve B by lowering the oxygen concentration, the ratio of $SO_3$ is also reduced to the value $R_{DB}$ which is lower than $R_{DA}$ as shown in FIG. 4. Therefore, the amount of $SO_3$ (the particulate matter) released from the sulfate absorbent 5 can be smaller than that when $SO_X$ is released in the oxygen concentration of curve A even if the temperature is the same.

As explained above, when the temperature of the sulfate absorbent 5 increases and reaches the releasing temperature after it has absorbed $SO_X$ in the exhaust gas, the amount of $SO_3$ (i.e., the amount of the particulate matter released into the atmosphere) can be reduced by either, (1) further increasing the temperature, or (2) lowering the oxygen concentration in the exhaust gas. The above methods (1) and (2) can be performed either separately or jointly. If both (1) and (2) are performed jointly, the amount of $SO_3$ released from the sulfate absorbent 5 can be further reduced.

In this embodiment, both of the methods (1) and (2) are performed to minimize the amount of $SO_3$ released from the sulfate absorbent 5. Namely, in this embodiment, if the exhaust gas temperature increases to the releasing temperature due to the change in the operating condition of the engine 1, the exhaust gas temperature is further increased and, at the same time, the oxygen concentration in the exhaust gas is lowered.

Usually, the diesel engine is operated on a considerably lean air-fuel ratio (for example, an air-fuel ratio of about 30), and the oxygen concentration in the exhaust gas is high. In this condition, the releasing temperature $T_D$ of the sulfate absorbent 5 becomes relatively high (for example, 500° to 600° C.) and, accordingly, the temperature $T_R$ also becomes high (for example, 700° to 800° C.). However, the exhaust gas temperature of the diesel engine in the normal operation is relatively low, and the exhaust gas temperature at the sulfate absorbent 5 is normally in the range between 250° to 400° C., and at the highest 600° C. (in a high load operation such as when ascending a slope). Therefore, in the practical operation of the diesel engine, the exhaust gas temperature is not likely to reach the temperature $T_R$ even though it may reach the releasing temperature $T_D$. Therefore, in this embodiment, the temperature of the sulfate absorbent is raised to the temperature $T_R$ by injecting secondary fuel into the exhaust gas passage 3 from the secondary fuel supply unit 7 (FIG. 1) when $SO_X$ is to be released from the sulfate absorbent 5. When fuel is injected into the exhaust gas passage 3 upstream of the sulfate absorbent 5, the injected fuel is oxidized (burned) by the oxidizing catalyst carried by the sulfate absorbent 5. Therefore, the temperature of sulfate absorbent 5 is raised rapidly by the combustion of the injected fuel. Further, since oxygen in the exhaust gas is consumed for burning the injected fuel, the oxygen concentration in the exhaust gas at the sulfate absorbent 5 is lowered. Therefore, by supplying the secondary fuel to the sulfate absorbent 5, the amount of $SO_3$ released from the sulfate absorbent 5 can be largely reduced.

Figure 5:
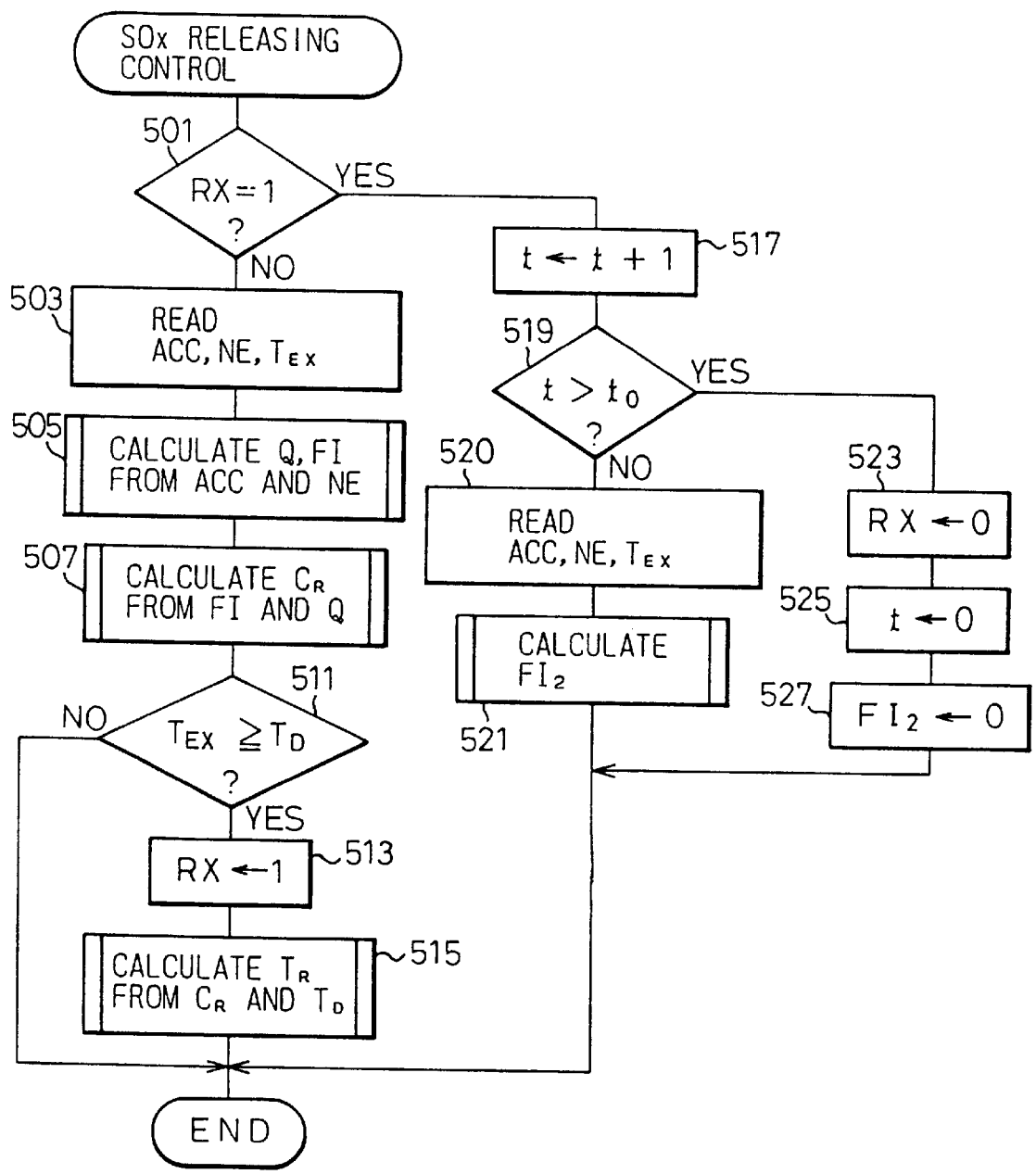
FIG. 5 is a flowchart showing an embodiment of the exhaust gas purifying method according to the present invention.

FIG. 5 is a flowchart showing the $SO_X$ releasing control of this embodiment. This routine is performed by the ECU 20 at predetermined regular intervals. In this routine, the ECU 20 calculates the operating air-fuel ratio of the engine (i.e., the oxygen concentration $C_R$ in the exhaust gas) based on the accelerator signal ACC and the engine speed NE. When the exhaust gas temperature $T_{EX}$ detected by the temperature sensor 8 reaches a predetermined releasing temperature $T_D$, the ECU 20 determines the temperature $T_R$ from the relationships in FIG. 4 based on the assumption that the oxygen concentration of the exhaust gas is unchanged from $C_R$. Then, the ECU 20 calculates the amount of fuel $FI_2$ injected from the secondary fuel supply unit 7 which is required to raise the exhaust gas temperature to the determined temperature $T_R$. The amount of fuel $FI_2$ is calculated in accordance with the present exhaust gas temperature $T_{EX}$ and the flow rate Q of intake air. After calculating the amount $FI_2$, the ECU 20 controls the secondary fuel supply unit 7 to inject fuel of the amount $FI_2$ into the exhaust gas passage 3 for a predetermined time. Thus, the injected fuel burns on the sulfate absorbent 5, and the exhaust gas temperature at the sulfate absorbent 5 rapidly increases to the temperature $T_R$, and the absorbed $SO_X$ is released from the sulfate absorbent 5. Further, since the oxygen concentration of the exhaust gas at the sulfate absorbent 5 becomes lower due to combustion of fuel, the ratio of $SO_3$ in the $SO_X$ released from the sulfate absorbent becomes even lower.

In this embodiment, the target temperature $T_R$ is determined from the relationships in FIG. 4 based on the assumption that the oxygen concentration in the exhaust gas is the same even after secondary fuel is supplied to the sulfate absorbent 5. However, the oxygen concentration at the sulfate absorbent 5 actually becomes lower than $C_R$ by the combustion of the injected fuel. Therefore, the actual equilibrium shifts to low oxygen concentration side (for example, the equilibrium shifts from the curve A to curve B in FIG. 4). This means that the actual equilibrium achieved is the point S on the curve B in FIG. 4 when the target temperature $T_R$ based on the oxygen concentration $C_R$ is used. Therefore, by using the target temperature $T_R$ calculated in accordance with the oxygen concentration $C_R$, the ratio of $SO_3$ becomes lower than that of equilibrium curve A even if the temperature is the same.

Next, the flowchart in FIG. 5 is explained in brief.

In FIG. 5, at step 501, it is determined whether the value of a releasing operation flag RX is 1. RX is a flag which represents whether the releasing operation is being performed, and set at 1 (which means that the operation is being performed) when the exhaust gas temperature $T_{EX}$ is larger than the releasing temperature $T_D$ at step 511.

If RX≠1 at step 501, the parameters ACC (the accelerator signal), NE (the engine speed) and $T_{EX}$ (the exhaust gas temp) are read from the respective sensors at step 503, and the fuel injection amount FI from the fuel injection valve 4 and the intake air flow amount Q are calculated at step 505 in accordance with the values of ACC and NE. The values of Q and FI are stored in the ROM of the ECU 20 as functions of ACC and NE.

At step 507 the operating air-fuel ratio of the engine is determined based on the values of Q (the amount of intake air) and FI (the amount of fuel supplied to the engine combustion chamber), and the oxygen concentration in the exhaust gas $C_R$ is calculated from the determined air-fuel ratio.

Then, at step 511, it is determined whether the exhaust gas temperature $T_{EX}$ reaches the releasing temperature $T_D$. If the exhaust gas temperature $T_{EX}$ does not reach the releasing temperature $T_D$ (i.e., if $T_{EX}<T_D$) at step 511, since this means that $SO_X$ is not being released from the sulfate absorbent 5, the routine terminates immediately. If $T_{EX} \geq T_D$ at step 511, since this means that the sulfate absorbent 5 has already started to release the absorbed $SO_X$, it is necessary to lower the ratio of $SO_3$ in the released $SO_X$. Thus, the routine executes step 513 to set the value of the releasing operation flag RX at 1, and step 513 to determine the temperature $T_R$ from the relationships in FIG. 4 based on the oxygen concentration $C_R$ and the releasing temperature $T_D$. Then, the routine terminates.

When the routine is performed next, the routine proceeds from step 501 to 517 since the value of the flag RX is already set at 1. At step 517, the value of a counter t is increased by 1, and at step 519 the value of the counter t after it is increased is determined whether it exceeds a predetermined value $t_0$. If $t \leq t_0$ at step 519, the present values of ACC, NE and $T_{EX}$ are read from the respective sensor at step 520, and the amount of secondary fuel $FI_2$ is calculated at step 521. When the amount $FI_2$ is calculated at step 521, the degree of opening of the flow control valve 7b is adjusted by another routine (not shown) performed by the ECU 20 to control the amount of fuel injected from the nozzle 7a at the value $FI_2$. Then, when the value of the counter t reaches the predetermined value $t_0$ at step 519, the values of the flag RX, the counter t and the fuel amount $FI_2$ are all set at 0 at steps 523 through 527. Namely, at steps 517 through 527, secondary fuel is injected into the exhaust gas passage 3 for a time corresponding to $t_0$, and the temperature of the sulfate absorbent is raised for this period. The value $t_0$ corresponds to a time required for the sulfate absorbent 5 to complete the releasing of the absorbed $SO_X$ and, determined in accordance with the type and size of the sulfate absorbent. In this embodiment, the value $t_0$ is set at a value corresponding to, for example, between several minutes and ten minutes.

Next, the calculation of the amount $FI_2$ of secondary fuel at step 521 is explained. At step 521, the amount $FI_2$ is calculated in the manner similar to the calculation of FI at step 505. Namely, at step 521, the intake air flow amount Q is calculated in accordance with the accelerator signal ACC and the engine speed NE. Then, the amount $FI_2$ of fuel required to raise the exhaust gas temperature from $T_{EX}$ to $T_R$ is calculated in accordance with the calculated intake air amount Q and the present exhaust gas temperature $T_{EX}$. Namely, $FI_2$ is calculated by $FI_2 = Q \times (T_R - T_{EX}) \times K$ (K is a constant).

Though the exhaust gas temperature during the releasing operation is controlled by the calculated value of $FI_2$, the secondary fuel amount $FI_2$ may be feedback-controlled in accordance with the difference between the target temperature $T_R$ and the actual temperature $T_{EX}$ detected by the sensor 8 (i.e., $T_R - T_{EX}$).

The target temperature $T_R$ is determined in accordance with the oxygen concentration $C_R$ before the secondary fuel injection starts in this embodiment. However, the target temperature $T_R$ becomes higher as the oxygen concentration $C_R$ (the air-fuel ratio of the engine) becomes higher. Therefore, instead of determining the temperature $T_R$ in accordance with the oxygen concentration $C_R$ every time, the target temperature $T_R$ may be set at a constant value $T_{R0}$. In this case, the temperature $T_{R0}$ is set at a target temperature suitable for the condition in which the air-fuel ratio of the engine (i.e., the oxygen concentration $C_R$) becomes the highest during the normal operation of the engine. By calculating the fuel amount $FI_2$ based on the value $T_{R0}$ suitable for the highest possible air-fuel ratio, the actual temperature of the sulfate absorbent 5 becomes always higher than the minimum temperature required to reduce the ratio of $SO_3$ in the released $SO_X$.

Next, another embodiment of the present invention is explained with reference to FIG. 6. In the embodiment in FIG. 5, the exhaust gas temperature is raised by supplying secondary fuel to the exhaust gas passage 3 in order to reduce the ratio of $SO_3$ in the released $SO_X$. However, as explained before, the ratio of $SO_3$ can be reduced by lowering the oxygen concentration in the exhaust gas instead of raising the exhaust gas temperature. Since the diesel engine 1 in this embodiment is provided with the intake shutter valve 6 and the EGR passage 13, the oxygen concentration of the exhaust gas can be lowered by using either of the intake shutter valve 6 and the EGR passage 13, or both.

For example, if the amount of intake air flow is throttled by the intake shutter valve 6, the air-fuel ratio of the engine (i.e., the oxygen concentration in the exhaust gas) can be lowered without supplying secondary fuel. Further, if a portion of exhaust gas is supplied to the intake air passage 2 through the EGR passage 13, since the mixture of fresh intake air and the exhaust gas having a low oxygen concentration is supplied to the engine, the oxygen concentration in the exhaust gas becomes low. FIG. 6 illustrates an $SO_X$ releasing control routine which reduces the oxygen concentration in the exhaust gas by means of either the intake shutter valve or the EGR passage 13, or both.

Figure 6:
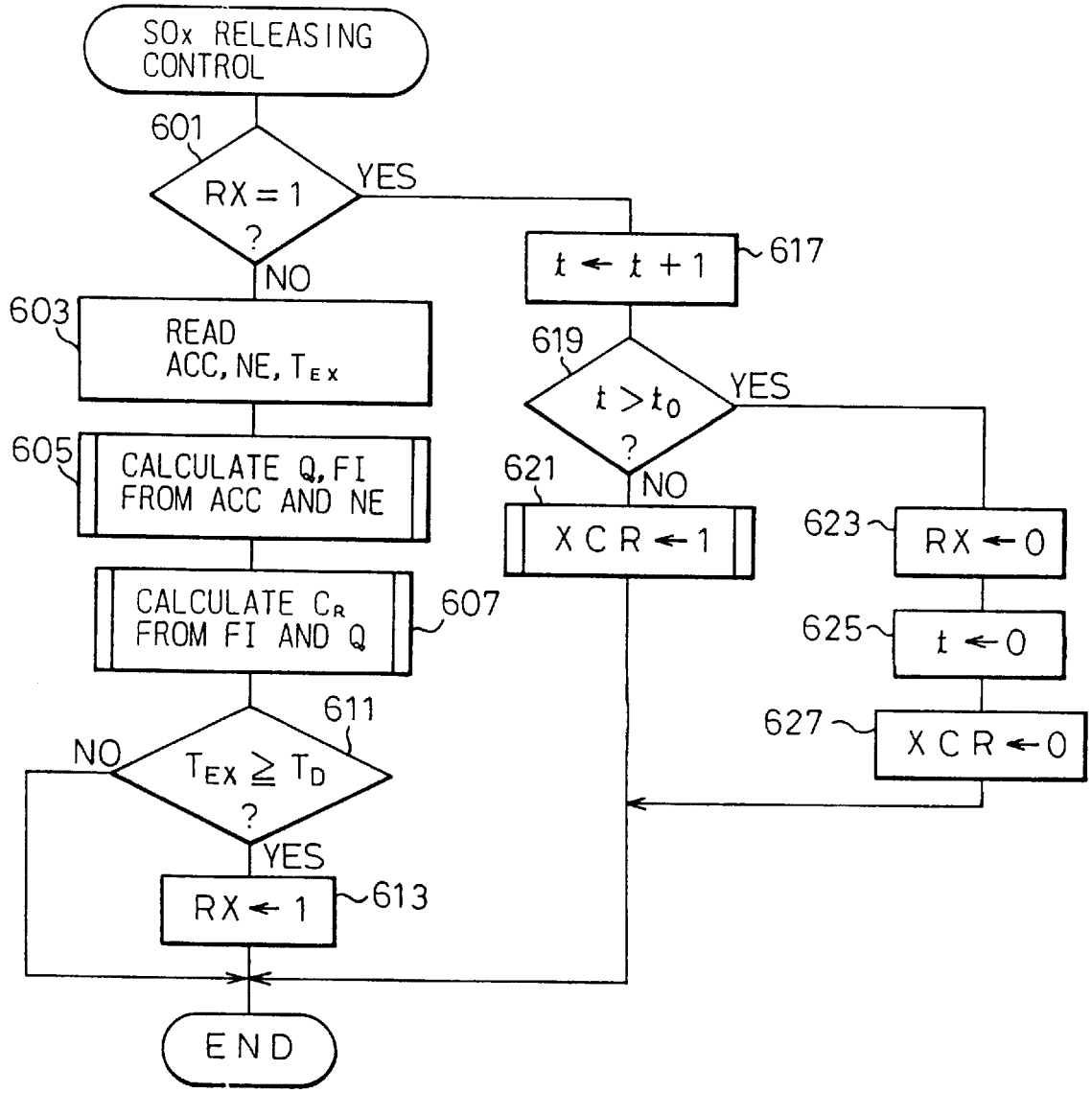
FIG. 6 is a flowchart showing another embodiment of the exhaust gas purifying method according to the present invention.

The flowchart in FIG. 6 is different from the flowchart in FIG. 5 in that the step corresponding to step 515 is not provided, that the value of a low oxygen flag XCR is set at 1 at step 621 instead of calculating the amount of secondary fuel $FI_2$, and that the value of the flag XCR is set at 0 at step 627. In this embodiment, when the value of the low oxygen flag XCR is set at 1, the intake shutter valve 6 is closed to a predetermined degree of opening and/or EGR control valve 10 is opened to a predetermined degree of opening by another routine (not shown) performed by the ECU 20, and, thereby the oxygen concentration in the exhaust gas becomes lower. The degree of opening of the intake shutter valve 6 when it closes, and the degree of opening of the EGR control valve 10 when it opens are determined in advance in such a manner that the oxygen concentration in the exhaust gas becomes sufficiently low. In addition to reducing the oxygen concentration in the exhaust gas by intake shutter valve 6 and/or EGR passage 13, if secondary fuel is supplied to the sulfate absorbent 5 in order to raise the temperature of the exhaust gas, the ratio of $SO_3$ in the released $SO_X$ can be further reduced as explained before.

Next, another embodiment of the present invention is explained. In the embodiment in FIGS. 5 and 6, the releasing operation of $SO_X$ is performed only when the exhaust gas temperature reaches the releasing temperature $T_D$. However, in some operating conditions, a low exhaust gas temperature continues for a long time. In this case, since the exhaust gas temperature does not reach the releasing temperature $T_D$, $SO_X$ is not released from the sulfate absorbent 5 and continues to accumulate therein. This may cause the sulfate absorbent 5 to be saturated with the absorbed $SO_X$. When the sulfate absorbent is saturated with the absorbed $SO_X$, the sulfate absorbent cannot absorb $SO_3$ any more, and $SO_3$ produced by the oxidizing catalyst is released into the atmosphere.

In order to prevent this problem, the $SO_X$ releasing control in this embodiment performs the releasing operation when the amount of $SO_X$ accumulated in the sulfate absorbent increases, as well as when the exhaust gas temperature reaches the releasing temperature.

Figure 7:
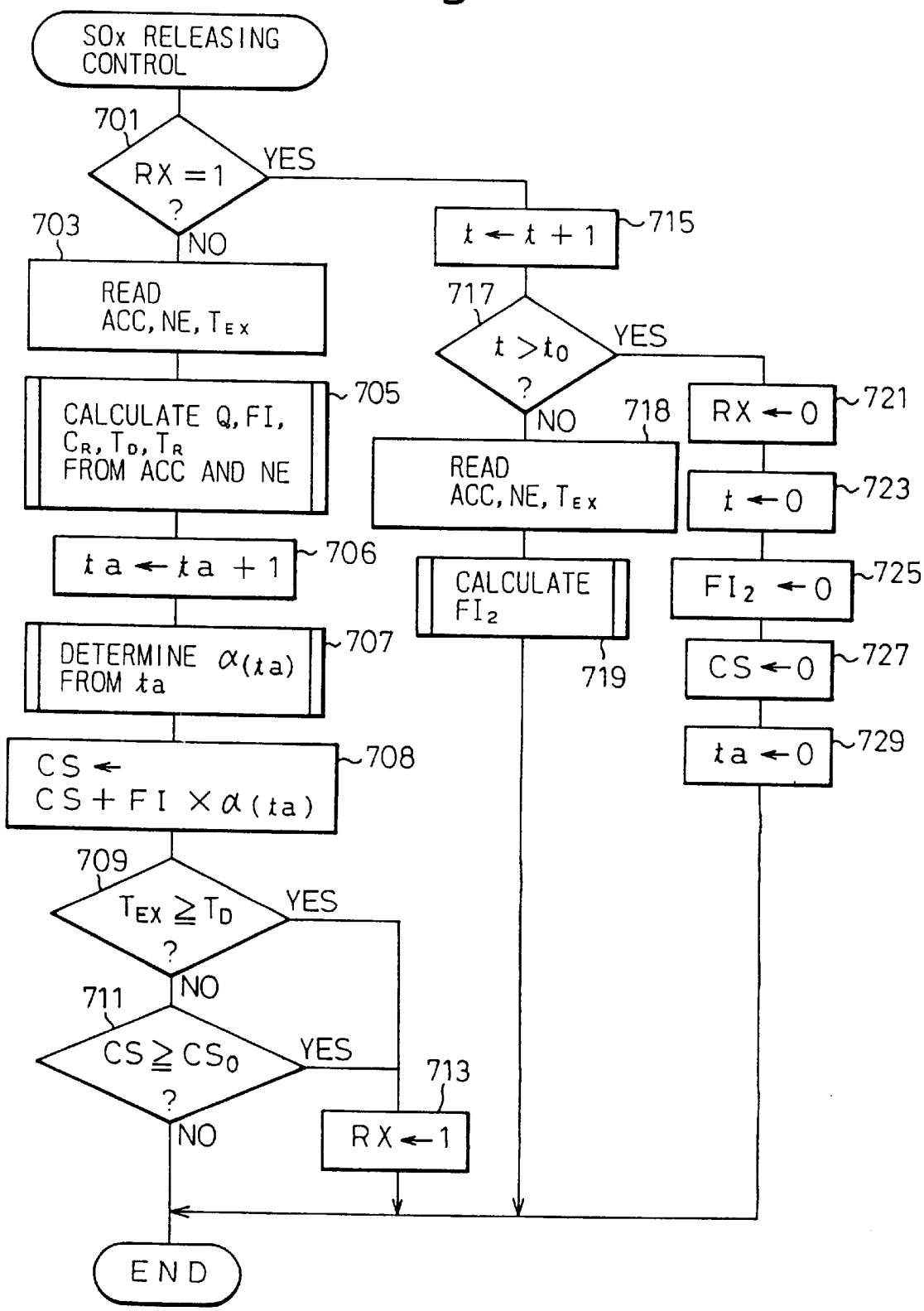
FIG. 7 is a flowchart showing another embodiment of the exhaust gas purifying method according to the present invention.

FIG. 7 is a flowchart illustrating the $SO_X$ releasing control in this embodiment. Similarly to the embodiment in FIG. 5, the ratio of $SO_3$ in the released $SO_X$ is reduced by supplying secondary fuel to the sulfate absorbent 5 in this embodiment.

Further, the ECU 20 in this embodiment detects the amount of $SO_X$ absorbed by the sulfate absorbent 5 by calculating a cumulative amount of fuel injected from the fuel injection valve 4. The amount of $SO_X$ produced by the engine 1 is proportional to the amount of fuel burned by the engine 1. Further, the amount of $SO_X$ absorbed by the sulfate absorbent per unit time can be calculated in accordance with the amount of $SO_X$ produced by the engine per unit time and an $SO_X$ absorbing characteristic of the sulfate absorbent.

Figure 15:
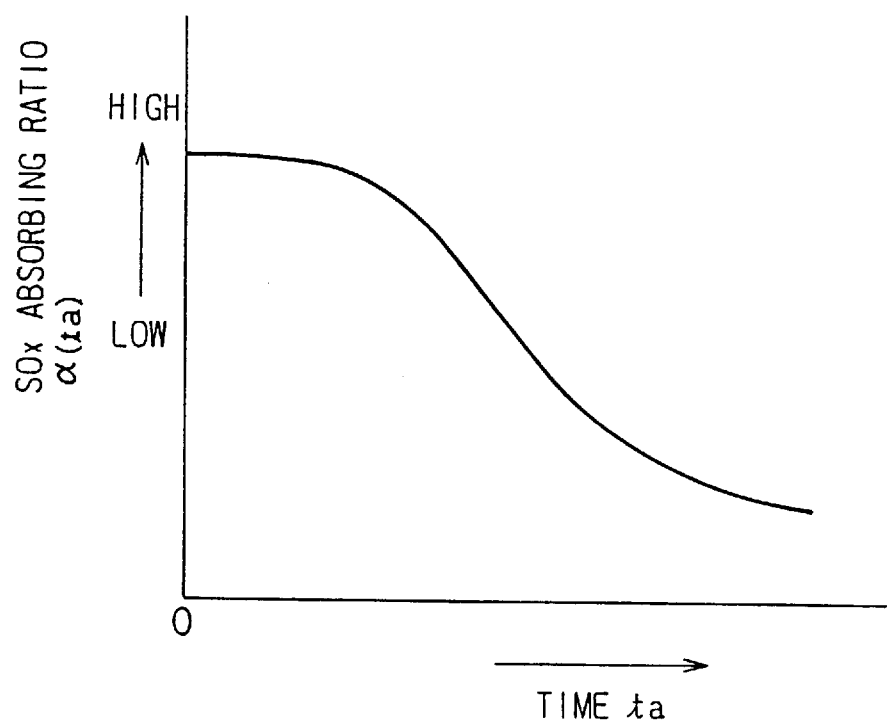
FIG. 15 is a diagram showing the change in the ability of the sulfate absorbent for absorbing $SO_X$ with a lapse of time.

FIG. 15 illustrates a typical $SO_X$ absorbing characteristic of the sulfate absorbent. The vertical axis in FIG. 15 represents an $SO_X$ absorbing ratio $\alpha_{(ta)}$, and the horizontal axis represents the time ta lapsed since the sulfate absorbent starts to absorb $SO_X$ in the exhaust gas. The $SO_X$ absorbing ratio $\alpha_{(ta)}$ in this embodiment is defined as a ratio of the amount of $SO_X$ absorbed by the sulfate absorbent to the amount of fuel burned by the engine. Since the amount of fuel burned by the engine is proportional to the amount of $SO_X$ produced by the engine, the $SO_X$ absorbing ratio $\alpha_{(ta)}$ corresponds to the ratio of the amount of $SO_X$ absorbed by the sulfate absorbent to the amount of $SO_X$ in the exhaust gas flowing into the sulfate absorbent 5. As illustrated in FIG. 15, as the time ta passes, the $SO_X$ absorbing ratio $\alpha_{(ta)}$ of the sulfate absorbent becomes low. The total amount of $SO_X$ absorbed by the sulfate absorbent in a given period (CS) can be calculated by cumulating the value obtained by multiplying the amount of fuel supplied to the engine per unit time by the $SO_X$ absorbing ratio $\alpha_{(ta)}$. Since the fuel injection amount FI represents the amount of fuel supplied to the engine per unit time, the total amount of $SO_X$ absorbed by the sulfate absorbent CS is calculated by cumulating the value $FI \times \alpha_{(ta)}$ (i.e., $CS = \Sigma(FI \times \alpha_{(ta)})$) in this embodiment.

Next, the flowchart of FIG. 7 is explained in brief.

In FIG. 7, steps 701 and 703 are the same as steps 501 and 503 in FIG. 5, i.e., it is determined whether the value of the releasing operation flag RX is 1 at step 701 and the accelerator signal ACC, the engine speed NE and the exhaust gas temperature $T_{EX}$ are read from the respective sensors at step 703. Further, the intake air flow amount Q, the fuel injection amount FI, the oxygen concentration in the exhaust gas $C_R$, the releasing temperature $T_D$ and the target temperature $T_R$ are calculated at step 705. The methods for calculating Q, FI, $C_R$, $T_D$ and $T_R$ are the same as the methods explained in FIGS. 5 and 6, and a detailed explanation is not given here.

At step 706, the value of a counter ta is increased by 1. As explained later, the value of counter ta is set at 0 at step 729 after the $SO_X$ releasing operation is completed. Therefore, the value of the counter ta represents the time elapsed after the previous $SO_X$ releasing operation has completed. At step 707, the $SO_X$ absorbing ratio $\alpha_{(ta)}$ is determined from FIG. 15 based on the value of the time counter ta. At step 708, the amount of $SO_X$ absorbed by the sulfate absorbent per unit time is calculated in accordance with the fuel injection amount FI and the $SO_X$ absorbing ratio $\alpha_{(ta)}$ by $FI \times \alpha_{(ta)}$, and CS, which is the total amount of $SO_X$ absorbed by the sulfate absorbent is calculated by cumulating the value of $FI \times \alpha_{(ta)}$.

Steps 709 and 711 are steps for determining whether the $SO_X$ releasing operation is required. In this embodiment, the $SO_X$ releasing operation is carried out when; (1) the exhaust gas temperature $T_{EX}$ reaches the releasing temperature $T_D$ (step 709), and (2) the amount CS of $SO_X$ absorbed by the sulfate absorbent reaches a predetermined value $CS_0$ (step 711). If either of the conditions (1) and (2) is satisfied, the routine sets the value of the flag RX at 1 (step 713) to initiate the $SO_X$ releasing operation. When the value of the flag RX is set at 1, the routine proceeds from step 701 to 715 in the next execution of the routine, and the amount $FI_2$ of secondary fuel is supplied to the exhaust gas passage 3 from the secondary fuel supply unit 7 for a time period $t_0$ to raise the temperature of the sulfate absorbent 5 to the target temperature $T_R$ (steps 715, 717, 718 and 719). Thus, $SO_X$ is released from the sulfate absorbent 5, and the ratio of $SO_3$ in the released $SO_X$ becomes low. When the time $t_0$ has lapsed, the values of the releasing operation flag RX, the time counter t, the amount $FI_2$ are set at 0 (steps 721, 723, 725), and the values of the calculated amount CS and the counter ta are set at 0 (steps 727, 729). Therefore, when the $SO_X$ releasing operation is completed, the amount of $SO_X$ absorbed by the sulfate absorbent 5 (i.e., CS) is set to 0, and the counter ta starts to count the time lapsed after the $SO_X$ releasing operation has completed.

Figure 8:
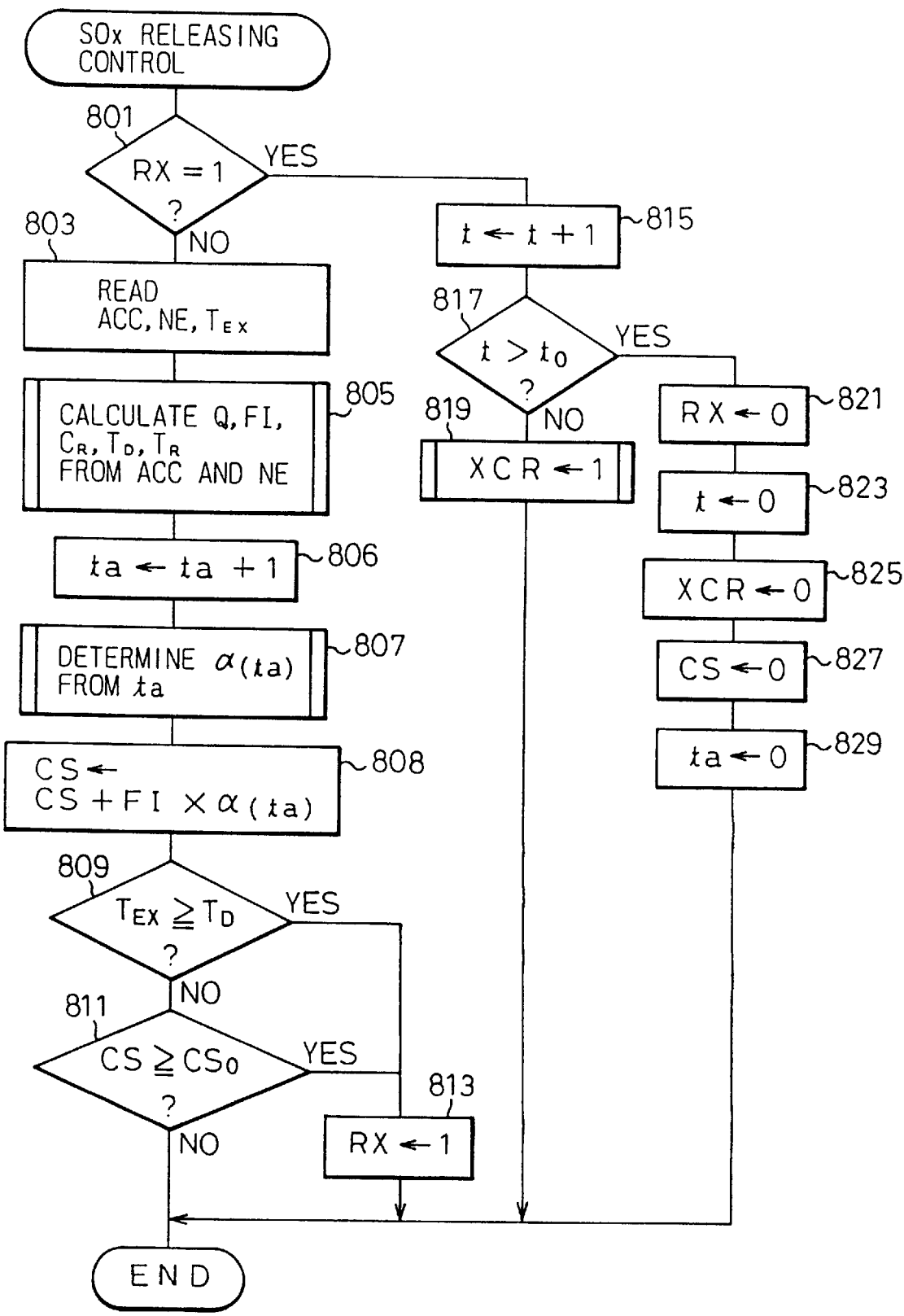
FIG. 8 is a flowchart showing another embodiment of the exhaust gas purifying method according to the present invention.

Though the exhaust gas temperature is raised to perform the $SO_X$ releasing operation in the embodiment of FIG. 7, the $SO_X$ releasing operation may also be performed by lowering the oxygen concentration in this embodiment. FIG. 8 shows the flowchart of another example of the $SO_X$ releasing operation of the present embodiment in which the $SO_X$ releasing operation is performed by reducing the oxygen concentration in the exhaust gas using the intake shutter valve 6 and the EGR passage 13. The respective steps in the flowchart of FIG. 8 is nearly the same as the steps of the flowcharts in FIGS. 7 and 8, and a detailed explanation is not given here.

Figure 9:
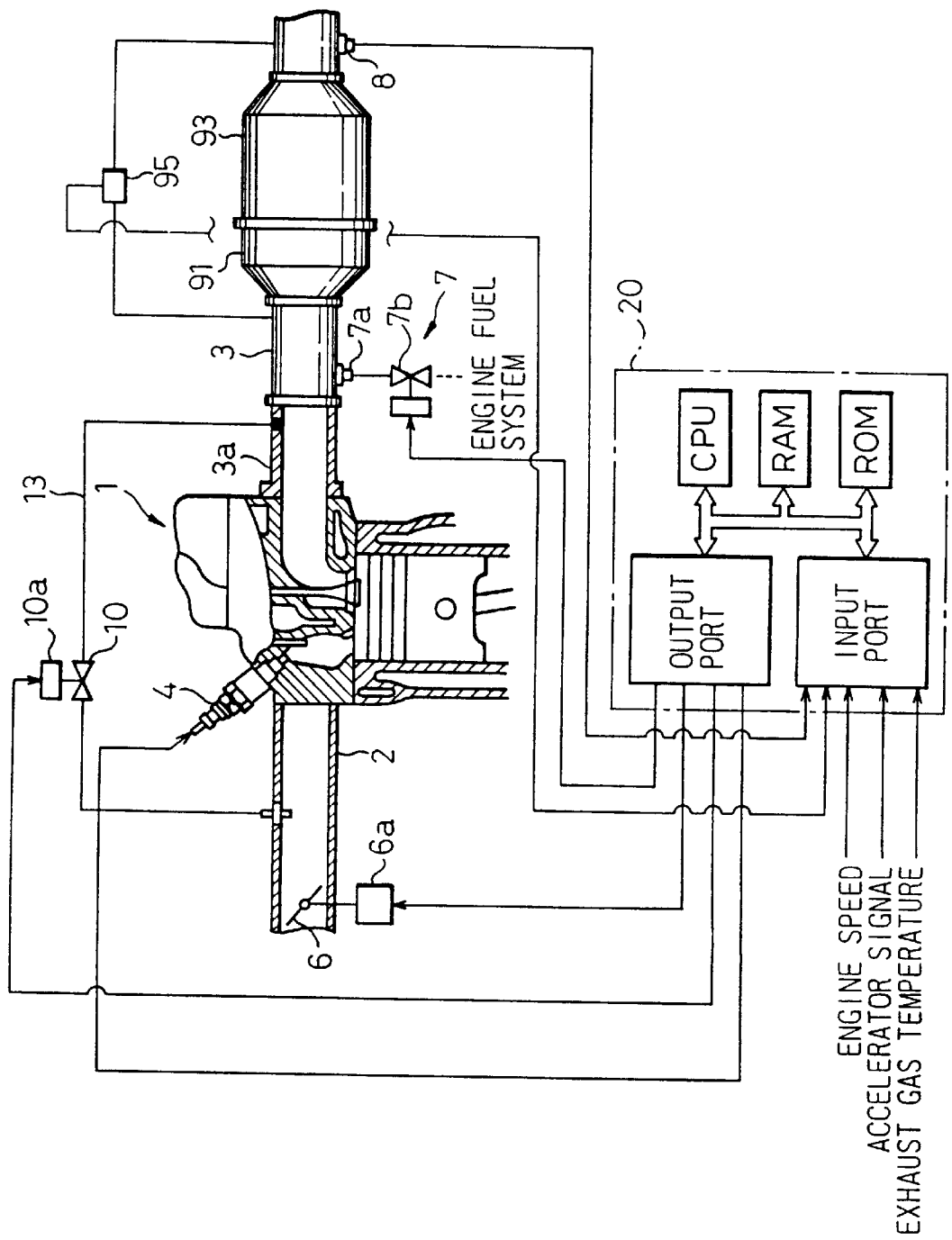
FIG. 9 schematically illustrates another embodiment of a device for conducting the method in the present invention.

Next, another embodiment of the present invention is explained with reference to FIG. 9. FIG. 9 is a drawing similar to FIG. 1 which illustrates an embodiment of a device for performing the method of the present invention. In FIG. 9, reference numerals the same as those in FIG. 1 represents similar elements.

As shown in FIG. 9, the nozzle 7a of the secondary fuel supply unit 7, an oxidizing catalyst 91 and a DPF (diesel particulate filter) 93 are disposed in the exhaust gas passage 3 from the upstream side in this order. Further, a differential pressure sensor 95 which detects the pressure drop through the DPF 93 is provided.

The oxidizing catalyst 91 uses a monolithic substrate made of cordierite, and catalytic components such as platinum (Pt), palladium (Pd) are attached to this substrate. The oxidizing catalyst 92 in this embodiment is used for oxidizing SOF in the exhaust gas during the normal operation, and also for burning the secondary fuel supplied to the exhaust gas passage 3 in order to initiate the combustion of soot collected by DPF 93 as explained later.

The DPF 93 acts as a filter which collects soot (carbon particles) in the exhaust gas to prevent soot from being released into the atmosphere. Further, the DPF 93 in this embodiment is constructed so that it also acts as the sulfate absorbent 5 in the previous embodiments.

DPF 93 is a honeycomb type porous filter made of, for example, cordierite. In the DPF 93, numerous exhaust gas passages are formed in parallel. Approximately half of the exhaust gas passages are plugged at the upstream ends thereof, and the rest of the passages are plugged at the downstream ends thereof. The exhaust gas passages plugged at the upstream ends and the exhaust gas passages plugged at the downstream ends are disposed in the DPF 93 alternately. The exhaust gas of the engine flows into the DPF 93 through the passages having open upstream ends, and flows into the exhaust gas passages having open downstream ends through porous walls separating the exhaust gas passages from each other, and flows out from the DPF 93 through the passages having open downstream ends. Therefore, particles such as soot (carbon particles) are collected by the porous walls of the DPF 93. In order to give the function of sulfate absorbent to the DPF 93, the wall of the surfaces of the exhaust gas passages in the DPF 93 in this embodiment is coated by the layer of alumina ($Al_2O_3$), silica ($SiO_2$) or titania ($TiO_2$), and catalytic components such as platinum (Pt) are carried on this layer.

During the normal operation of the diesel engine 1, the DPF 93 acts as a conventional particulate filter and collects particulate matter such as soot in the porous wall and, in addition to that, the DPF 93 also acts as a sulfate absorbent and absorbs $SO_X$ produced by the oxidizing catalyst 91 in the absorbent layer on the wall surface of the exhaust gas passages. When it is necessary to release the absorbed $SO_X$ (for example, when the exhaust gas temperature reaches the releasing temperature of the absorbent, and/or when the amount of the $SO_X$ absorbed by the absorbent reaches a predetermined value), or when the pressure drop through the DPF 93 increases due to accumulation of soot collected in the DPF 93, the ECU 20 supplies secondary fuel from the secondary fuel supply unit 7 to burn the soot on the DPF and to perform the releasing of $SO_X$ from the absorbent layer at the same time. When secondary fuel is supplied to the exhaust gas passage 3 upstream of the oxidizing catalyst 91, fuel is burned (oxidized) on the oxidizing catalyst 91. Therefore, the temperature of the exhaust gas flowing into the DPF 93 becomes high due to combustion of fuel on the oxidizing catalyst 91, and the soot (the carbon particles) collected by the DPF 93 starts to burn from the upstream side of the DPF 93. The hot exhaust gas flows into the DPF 93 is further heated by the combustion of soot in the DPF, and the oxygen concentration in the exhaust gas is lowered by the combustion of secondary fuel and soot. This causes the absorbent layer on the DPF 93 to release the absorbed $So_x$. The temperature of the exhaust gas increases, and the oxygen concentration thereof decreases as the exhaust gas flows down through the DPF 93 due to combustion of soot in the DPF. Therefore, both the highest temperature of the exhaust gas and the lowest oxygen concentration thereof are achieved at the downstream end of the DPF 93 at the same time. Since the ratio of $SO_3$ in the $SO_X$ released from the DPF 93 is determined by the temperature and the oxygen concentration at the outlet of the DPF 93, the ratio of $SO_3$ in the $SO_X$ released from the DPF 93 becomes extremely low. Thus, according to the present embodiment, both the carbon particles (soot) and other particulate matter ($SO_3$) released into the atmosphere can be largely reduced.

Figure 10:
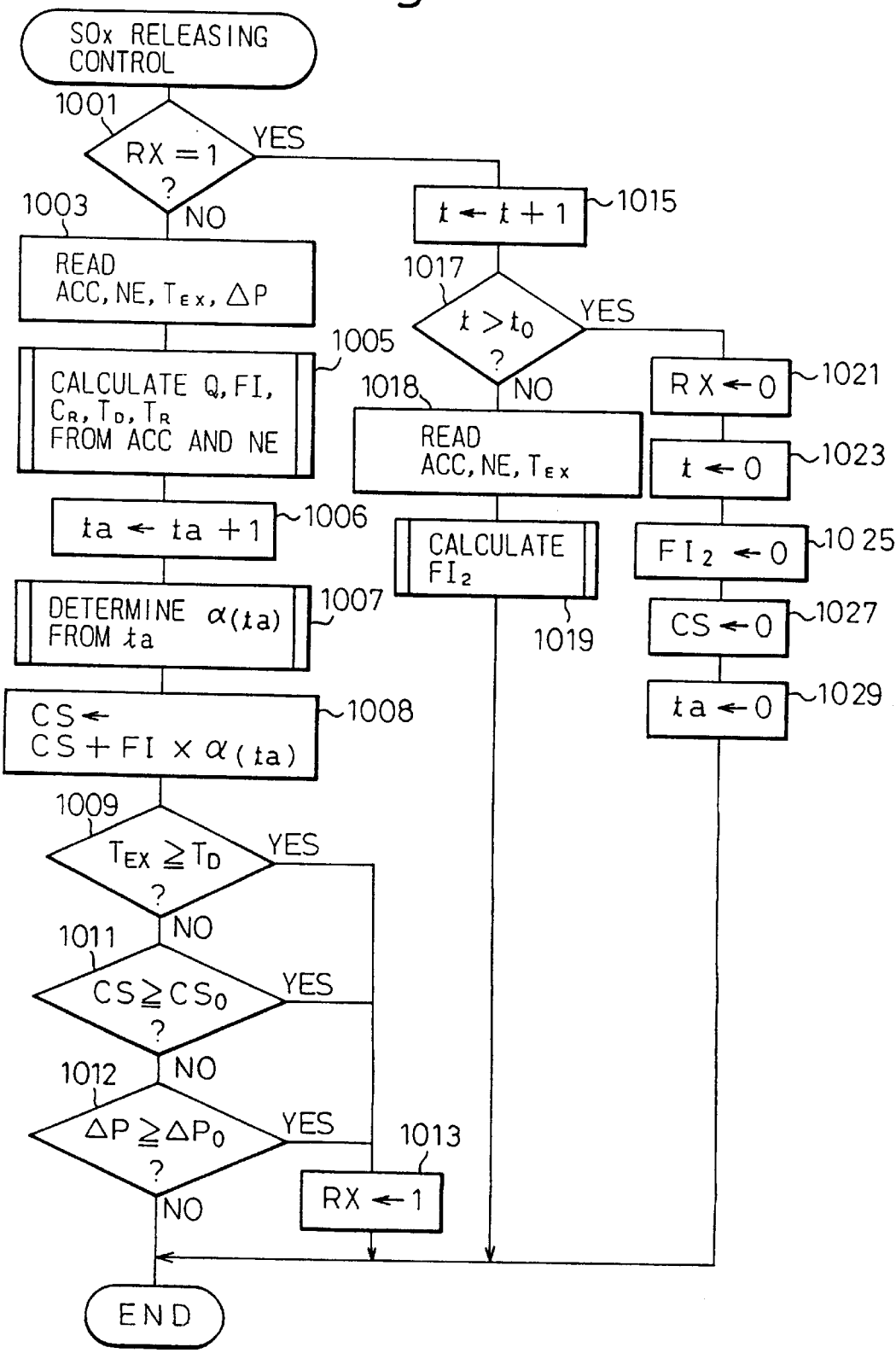
FIG. 10 is a flowchart showing an embodiment of the exhaust gas purifying method using the device in FIG. 9.

FIG. 10 is a flowchart illustrating an embodiment of the routine for performing the $SO_X$ releasing control as explained above. This routine is performed by the ECU 20 at predetermined regular intervals.

In the routine of FIG. 10, the burning of the soot on the DPF 93 and the releasing of the $SO_X$ from the absorbent layer in the DPF 93 are performed in the manner similar to that of the routine in FIG. 7. Namely, in FIG. 10, at step 1003, the pressure drop $\Delta P$ is read from the differential pressure sensor 95, as well as the accelerator signal ACC, the engine speed NE and the exhaust gas temperature $T_{EX}$. At steps 1005 and 1007, the releasing temperature $T_D$ Of the absorbent, the target temperature $T_R$, the amount CS of the $SO_X$ absorbed by the absorbent are calculated in the manner same as those in the previous embodiments.

As explained before, the $SO_X$ releasing operation is performed by this routine when; (1) the exhaust gas temperature $T_{EX}$ reaches the releasing temperature $T_D$ (step 1009), (2) the amount CS of $SO_X$ absorbed by the absorbent reaches a predetermined value $CS_0$ (step 1011) and, in addition to that, (3) when the pressure drop $\Delta P$ through the DPF 93 reaches a predetermined value $\Delta P_0$ (step 1012). If any of the above conditions (1), (2) and (3) is satisfied, the value of the releasing operation flag RX is set at 1 at step 1013, and the amount $FI_2$ of the secondary fuel is supplied to the exhaust gas passage 3 for a time period $t_0$ at steps 1015 through 1027. These steps are the same as steps 715 through 727 in FIG. 7 and, thus, soot on the DPF 93 is burned and the ratio of $SO_3$ in the released $SO_X$ is reduced at the same time.

Next, another embodiment of the present invention is explained.

In the embodiments explained above, the ratio of $SO_3$ in the released $SO_X$ is reduced by increasing the temperature of the sulfate absorbent and/or lowering the oxygen concentration in the exhaust gas when the absorbed $SO_X$ is released from the sulfate absorbent. However, the ratio of $SO_3$ can be reduced by other methods. It was found that if a substance having an affinity for oxygen greater than the affinity of $SO_2$ for oxygen is supplied to the sulfate absorbent when $SO_X$ is released, the ratio of $SO_3$ in the released $SO_X$ becomes low.

As explained before, when $SO_X$ is released from the sulfate absorbent, $SO_4^{2-}$ ions released from the sulfate absorbent react with $O_2^-$ or $O^{2-}$ on the surface of Pt and form $SO_2$ and $SO_3$. In this case, if a substance having a greater affinity for oxygen than $SO_2$, such as HC or CO exists, $O_2^-$ and $O^{2-}$ combine with these substance rather than with $SO_4^{2-}$ ions. Therefore, $O_2^-$ and $O^{2-}$ on the surface of Pt are consumed by these substance, and the oxygen concentration on the surface of Pt becomes low. This makes the reaction $SO_4^{2-} \rightarrow SO_3$ less likely to occur. Therefore, the reaction $SO_4^{2-} \rightarrow SO_2$ becomes more likely to occur compared to the reaction $SO_4^{2-} \rightarrow SO_3$. Further, since the affinity of the substance for oxygen is greater than the affinity of $SO_2$ for oxygen, the reaction $SO_2+1/2O_2 \rightarrow SO_3$ is not likely to occur and the $SO_2$, even if it is produced, is not converted to $SO_3$. Therefore, the ratio of $SO_3$ in the $SO_X$ mixture released from the sulfate absorbent can be lowered by supplying the substance having a larger affinity for oxygen than $SO_2$ to the sulfate absorbent during the $SO_X$ releasing operation.

Figure 11:
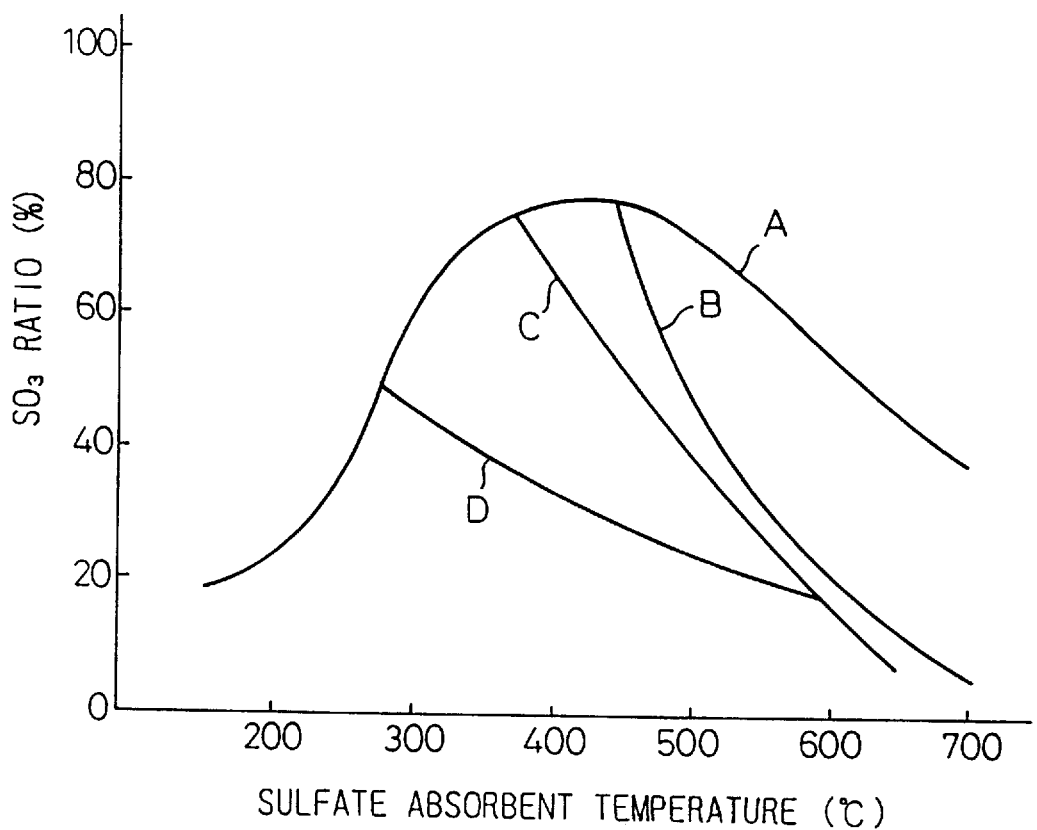
FIG. 11 is a diagram showing the change in the ratio of $SO_3$ in the $SO_X$ released from the sulfate absorbent when the amount of secondary fuel supplied to the sulfate absorbent is changed.

FIG. 11 is a diagram illustrating the change in the ratio of $SO_3$ in the $SO_X$ released from the sulfate absorbent in accordance with the change in the amount of secondary fuel (diesel fuel) supplied to the exhaust gas passage 3 which is measured using the device in FIG. 1. The vertical axis in FIG. 11 represents the ratio of $SO_3$ in the total amount of $SO_X$ at the outlet of the sulfate absorbent 5, the vertical axis represents the temperature of the sulfate absorbent 5 which is measured by a temperature sensor disposed on the substrate of the sulfate absorbent 5. The respective curves in FIG. 11 a represent the change in the ratio of $SO_3$ in accordance with the change in the temperature of the substrate of the sulfate absorbent 5 when the engine is running at a same speed. The curve A in FIG. 11 shows the case in which secondary fuel is not supplied to the exhaust gas, and the temperature of the sulfate absorbent 5 is changed by adjusting the engine load. The curves B through D show the cases in which the engine load is maintained constant, and the temperature of the sulfate absorbent 5 is changed by adjusting the amount of secondary fuel supplied to the sulfate absorbent. While the engine load is maintained constant in the respective cases of the curves B through D, the engine load is becomes lower in the order of B, C, D (i.e., B>C>D).

As shown by the curve A in FIG. 11 (the case in which no secondary fuel is supplied), the ratio of $SO_3$ at the outlet of the sulfate absorbent 5 changes in the same manner as shown by the broken line in FIG. 3. In this case, as explained before, the ratio of $SO_3$ is determined only by the temperature.

In the curves B, C and D, the engine load is maintained constant and the temperature of the sulfate absorbent is adjusted by the amount of secondary fuel. Therefore, in the curves B, C and D, the amount of secondary fuel becomes larger as the temperature of the sulfate absorbent becomes higher.

The temperature of the sulfate absorbent is determined by the exhaust gas temperature. Therefore, it is considered that the temperature of the sulfate absorbent changes in accordance with the ratio of the total amount of fuel supplied to the engine combustion chamber and the exhaust gas passage 3 to the amount of intake air. Further, since the engine speed is the same for all cases in FIG. 11, the amount of intake air is also the same for all cases in FIG. 11. Therefore, the points on the curves A through D of a same temperature represents the operating conditions in which the total amount of fuel supplied to the combustion chamber and to the exhaust gas passage is the same. Further, in this case, since the amount of intake air is the same in all the cases in FIG. 11, the air-fuel ratio of the exhaust gas flows into the sulfate absorbent becomes the same if the temperature of the sulfate absorbent is the same. In other words, the curve A represents the case in which all of the amount of fuel required to achieve a certain temperature of the sulfate absorbent is supplied to the combustion chamber of the engine, and the curves B, C and D represent the cases in which a part of fuel is supplied to the combustion chamber and the rest of fuel is supplied to the exhaust gas passage to achieve the same temperature as the curve A.

Further, since the amount of fuel supplied to the combustion chamber of the engine becomes smaller as the engine load decreases, the amount of secondary fuel becomes larger as the engine load becomes smaller if the temperature of the sulfate absorbent is the same. Namely, when the points on curves A through D of the same temperature are compared, the amount of secondary fuel is largest at the curve D, and becomes smaller in the order of the curves C, B, A (i.e., D>C>B>A).

As seen from FIG. 11, when the temperature of the sulfate absorbent is the same, the ratio of $SO_3$ in the released $SO_X$ is the largest in the case of the curve A (i.e., the amount of secondary fuel is 0), and is the smallest in the case of the curve D (i.e., the amount of secondary fuel is the largest). Since the air-fuel ratio of the exhaust gas, i.e., the oxygen concentration of the exhaust gas is the same when the temperature of the sulfate absorbent is the same, this means that the ratio of $SO_3$ becomes smaller as the amount of secondary fuel is larger even if the oxygen concentration of the exhaust gas is the same.

The reason why the ratio of $SO_3$ decreases as the amount of secondary fuel increases even in the condition in which the temperature of the sulfate absorbent and the oxygen concentration in the exhaust gas are the same is explained as follows.

When secondary fuel is supplied to the exhaust gas passage, it is oxidized (burned) by $O_2^-$ and $O^{2-}$ on the surface of the catalyst on the sulfate absorbent. This reduces the oxygen concentration on the catalyst surface and, at the same time, produces a relatively large amount of unburned HC and CO in the exhaust gas. Since HC and CO have a great affinity for oxygen, HC and CO further remove $O_2^-$ and $O^{2-}$ from the surface of the catalyst and the concentration of $O_2^-$ and $O^{2-}$ on the surface of the catalyst becomes very low. Therefore, $SO_4^{2-}$ ions released from the absorbent cannot obtain a sufficient amount of $O_2^-$ or $O^{2-}$ to form $SO_3$, and the reaction $SO_4^{2-} \rightarrow SO_3$ becomes less likely to occur. This causes the ratio of $SO_3$ in the $SO_X$ released from the sulfate absorbent to become lower. Further, since the affinity of HC and CO for oxygen is greater than the affinity of $SO_2$ for oxygen, the reaction $SO_2+1/2O_2 \rightarrow SO_3$ also becomes less likely to occur. Therefore, even if $SO_2$ is produced on the surface of the catalyst, $SO_2$ is not oxidized to $SO_3$. Thus, by increasing the amount of secondary fuel, the ratio of $SO_3$ in the $SO_X$ released from the sulfate absorbent decreases.

It is true that the fuel supplied to the combustion chamber also produces unburned HC and CO. However, the combustion in the combustion chamber of the diesel engine is performed under a large air-excess ratio, and the amount of HC and CO produced by the combustion is relatively small. Therefore, even if the total amount of the fuel is the same, the amount of HC and CO supplied to the sulfate absorbent increases as the amount of secondary fuel supplied to the exhaust gas passage increases.

Figure 12:
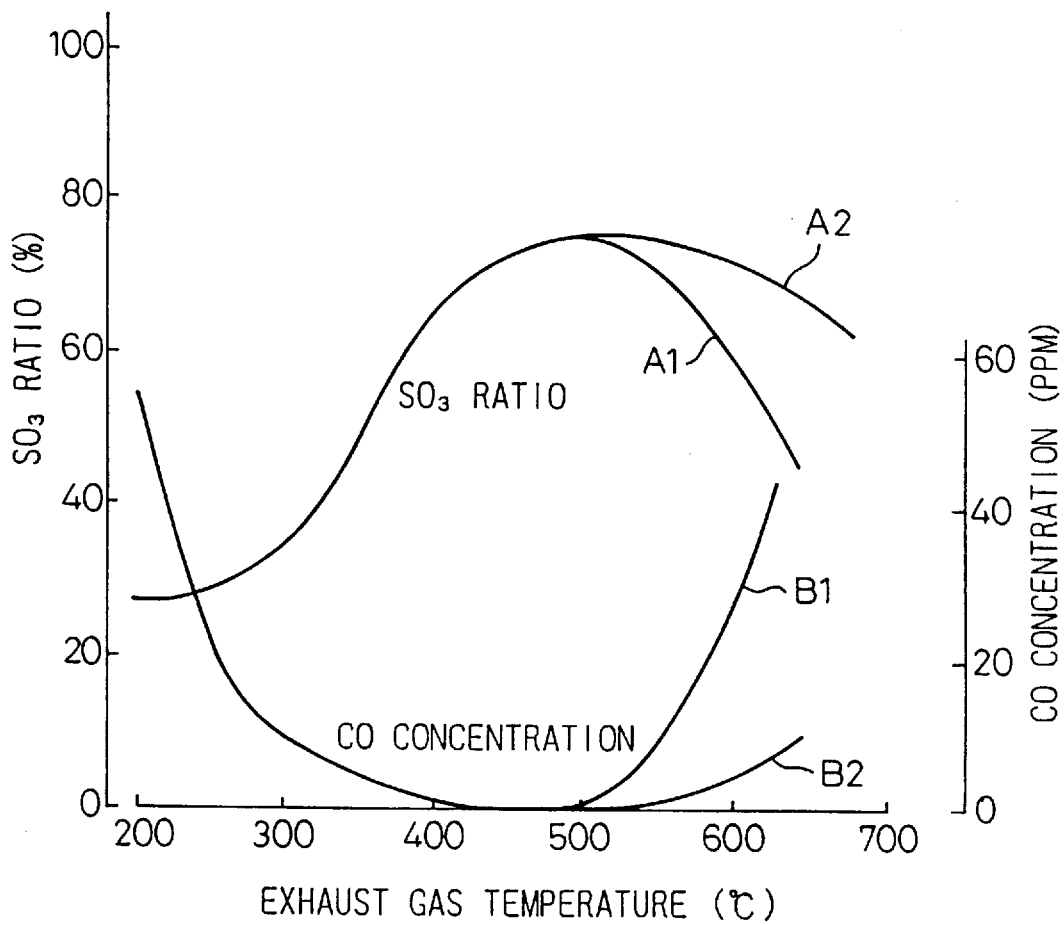
FIG. 12 is a diagram showing the change in the ratio of $SO_3$ in the $SO_X$ released from the sulfate absorbent caused by the combustion of soot on the DPF.

Though FIG. 11 shows the case in which HC and CO are supplied to the sulfate absorbent by secondary fuel, the ratio of $SO_3$ can be reduced by supplying the substance having a great affinity such as CO to the sulfate absorbent by other methods. FIG. 12 shows the case in which soot on the DPF 93 in FIG. 9 is burned by increasing exhaust gas temperature without supplying secondary fuel. In FIG. 12, the horizontal axis represents the temperature of the exhaust gas flowing into the DPF (sulfate absorbent) 93 and the vertical axis represents the ratio of $SO_3$ in the $SO_X$ released from the DPF and the concentration of CO in the exhaust gas. The curves A1 and A2 in FIG. 12 show the change in the ratio of $SO_3$ and the curves B1 and B2 show the change in the concentration of CO, respectively. Further, the curves A1 and B1 represent the case in which the amount of soot collected by the DPF 93 is large, and the curves A2 and B2 represent the case in which the amount of soot collected by DPF 93 is small.

In FIG. 12, when the temperature of exhaust gas increases, the soot collected on the DPF 93 starts to burn at around 550° C. This causes the concentration of CO in the exhaust gas to increase. The concentration of CO in the exhaust gas increases as the exhaust gas temperature becomes higher. Further, the amount (concentration) of CO in the exhaust gas is large when the amount of soot collected by the DPF 93 is larger (the curve B1), and smaller when the amount of soot is small (the curve B2). When the temperature of the exhaust gas increases, $SO_X$ is released from the absorbent. However, the ratio of $SO_3$ in the released $SO_X$ is different when the amount of CO in the exhaust gas is different. Namely, when the amount of soot collected by the DPF 93 is small (the curve A2), the ratio of $SO_3$ in the released $SO_X$ changes in accordance with the temperature of the exhaust gas in the manner same as that represented by the broken line in FIG. 3. However, when the amount of soot collected by the DPF 93 is large (the curve A1), the ratio of $SO_3$ in the released $SO_X$ decreases more rapidly as the exhaust gas temperature increases (i.e., as the amount of CO in the exhaust gas increases).

Figure 13:
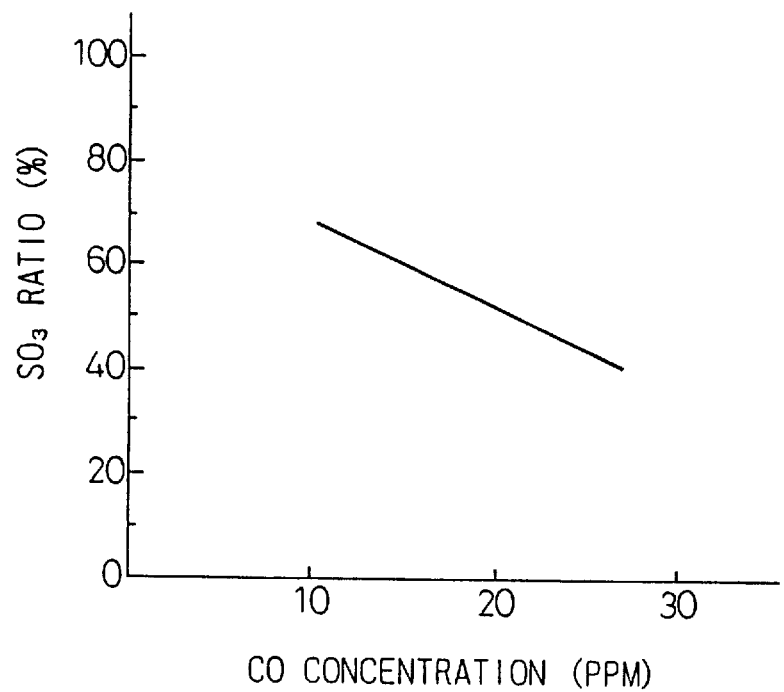
FIG. 13 is a diagram showing the change in the ratio of $SO_3$ in the $SO_X$ released from the sulfate absorbent in accordance with the change in the concentration of carbon monoxide in the exhaust gas.

FIG. 13 is a diagram showing the change in the ratio of $SO_3$ shown in FIG. 12, but the horizontal axis thereof is re-drawn in terms of the concentration of CO in the exhaust gas. As shown in FIG. 13, the ratio of $SO_3$ in the released $SO_X$ decreases as the concentration of CO in the exhaust gas increases. This means that if CO is supplied to the sulfate absorbent when $SO_X$ is released, the ratio of $SO_3$ is reduced without supplying secondary fuel. Thus, it will be understood that if the substance having a greater affinity for oxygen than $SO_2$ is supplied to the sulfate absorbent when $SO_X$ is released, the ratio of $SO_3$ in the released $SO_X$ can be largely reduced. Such a substance may be HC and CO produced by secondary fuel supplied to the exhaust gas, or CO produced by the combustion of soot on the DPF. These methods for supplying the substance may be performed separately or in combination.

Figure 14:
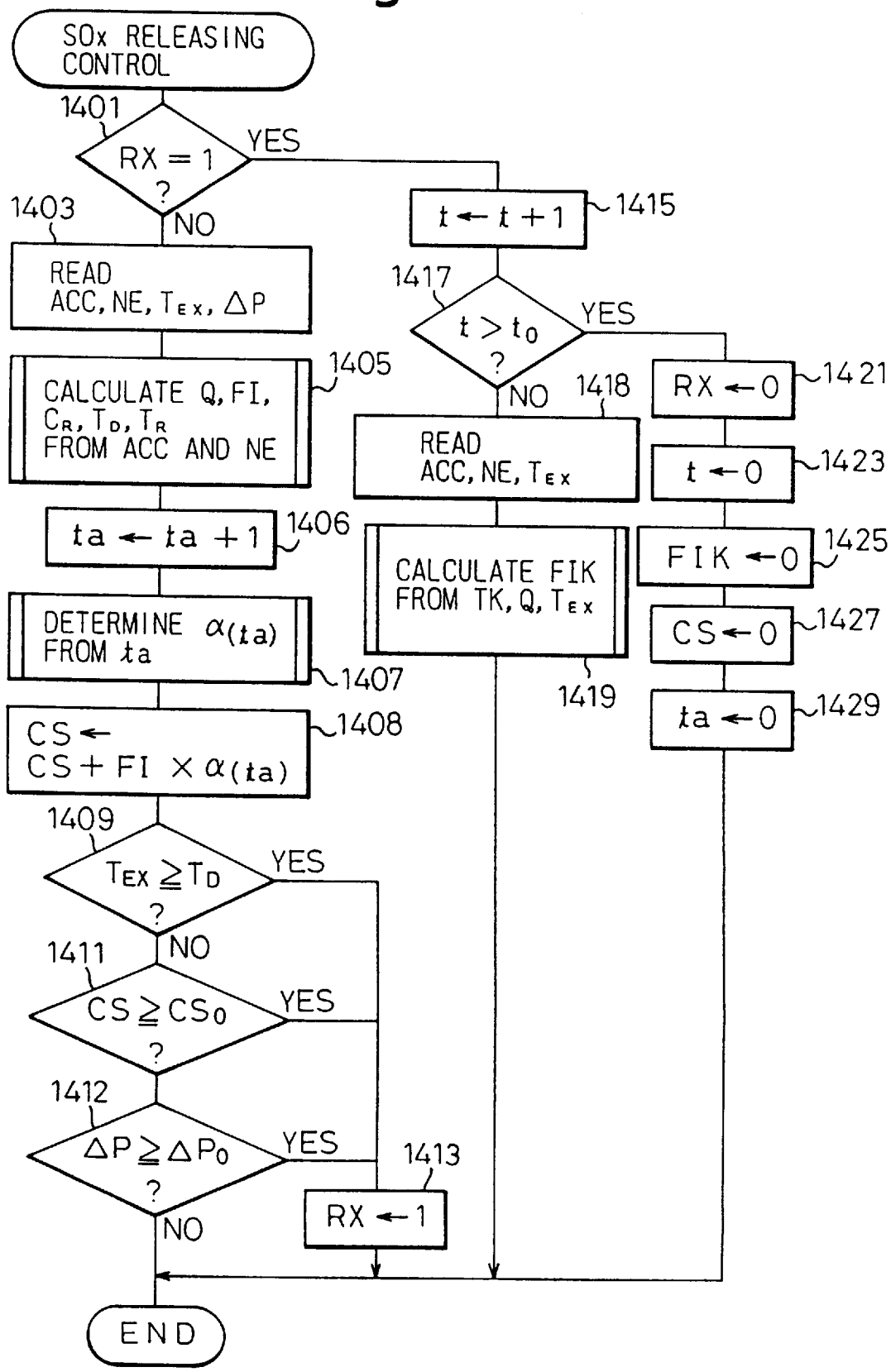
FIG. 14 is a flowchart showing another embodiment of the exhaust gas purifying method according to the present invention.

FIG. 14 is a flowchart illustrating an $SO_X$ releasing control in which HC and CO are supplied to the sulfate absorbent by using both methods (combustion of secondary fuel and soot) in combination in the device in FIG. 9. This routine is performed by the ECU 20 at a predetermined regular intervals.

The flowchart in FIG. 14 is the same as the flowchart in FIG. 10 except that the target temperature TK in this embodiment (step 1419) is set at a constant value regardless of the oxygen concentration $C_R$ although the target temperature $T_R$ in FIG. 10 is determined in accordance with the releasing temperature $T_D$ and the oxygen concentration $C_R$ (step 1005 in FIG. 10). The amount of secondary fuel FIK in this embodiment is calculated in accordance with the amount of intake air Q, the exhaust gas temperature $T_{EX}$ and the target temperature TK of fixed value.

The target temperature TK is set at a temperature at which the concentration of CO is increased by the combustion of soot (FIG. 12) and the ratio of $SO_3$ is decreased by the supply of secondary fuel (FIG. 11). Namely, in case of FIGS. 11 and 12, the target temperature TK is set at a temperature between 600° to 700° C. According to the embodiment in FIG. 14, since the substance (such as HC and CO) having a greater affinity for oxygen than the affinity of $SO_2$ for oxygen is supplied to the sulfate absorbent when $SO_X$ is released, the ratio of $SO_3$ in the released $SO_X$ is largely reduced.

As explained above, according to the present invention, since the ratio of $SO_3$ in the $SO_X$ released from the sulfate absorbent is largely reduced, the amount of particulate matter released into the atmosphere can be maintained at low level even if the engine is operated for a long period.

We claim:

1. A method for purifying the exhaust gas of an internal combustion engine comprising:

a step for contacting the exhaust gas of an internal combustion engine containing sulfur oxide with a sulfate absorbent at a temperature lower than a releasing temperature, said sulfate absorbent absorbing sulfur oxide in the exhaust gas when the temperature is lower than said releasing temperature and releasing the absorbed sulfur oxide when the temperature becomes higher than said releasing temperature;

a step for raising the temperature of the sulfate absorbent after it has absorbed sulfur oxide to a predetermined temperature higher than said releasing temperature to, thereby, cause the sulfate absorbent to release the absorbed sulfur oxide;

wherein said predetermined temperature is selected in such a manner that the ratio of the sulfur trioxide component in the sulfur oxide mixture released from the sulfate absorbent at said predetermined temperature becomes lower than the ratio of the sulfur trioxide in the sulfur oxide mixture released from the sulfate absorbent at said releasing temperature.

2. A method according to claim 1, wherein said step for raising the temperature of the sulfate absorbent further comprises a step for determining whether the temperature of the sulfate absorbent reaches said releasing temperature, and a step for further raising the temperature of the sulfate absorbent to said predetermined temperature when it is determined that the temperature of the sulfate absorbent has reached said releasing temperature.

3. A method according to claim 1, wherein said step for raising the temperature of the sulfate absorbent further comprises a step for determining whether the amount of sulfur oxide absorbed by the sulfate absorbent reaches a predetermined value, and a step for raising the temperature of the sulfate absorbent to said predetermined temperature when it is determined that the amount of sulfur oxide absorbed by the sulfate absorbent has reached said predetermined value.

4. A method according to claim 1, further comprising a step for supplying a substance having an affinity for oxygen greater than the affinity of sulfur dioxide for oxygen to the sulfate absorbent when the absorbed sulfur oxide is released from the sulfate absorbent.

5. A method according to claim 2, further comprising a step for supplying a substance having an affinity for oxygen greater than the affinity of sulfur dioxide for oxygen to the sulfate absorbent when the absorbed sulfur oxide is released from the sulfate absorbent.

6. A method according to claim 3, further comprising a step for supplying a substance having an affinity for oxygen greater than the affinity of sulfur dioxide for oxygen to the sulfate absorbent when the absorbed sulfur oxide is released from the sulfate absorbent.

7. A method for purifying the exhaust gas of an internal combustion engine comprising:

a step for contacting the exhaust gas of an internal combustion engine containing sulfur oxide with a sulfate absorbent at a temperature lower than a releasing temperature, said sulfate absorbent absorbing sulfur oxide in the exhaust gas when the temperature is lower than said releasing temperature and releasing the absorbed sulfur oxide when the temperature becomes higher than said releasing temperature or when the concentration of oxygen in the exhaust gas becomes low;

a step for determining whether the temperature of the sulfate absorbent has reached said releasing temperature; and a step for lowering the concentration of oxygen in the exhaust gas when it is determined that the temperature of the sulfate absorbent has reached said releasing temperature to, thereby cause the sulfate absorbent to release the absorbed sulfur oxide.

8. A method according to claim 7, further comprising a step for supplying a substance having an affinity for oxygen greater than the affinity of sulfur dioxide for oxygen to the sulfate absorbent when the absorbed sulfur oxide is released from the sulfate absorbent.

9. A method for purifying the exhaust gas of an internal combustion engine comprising:

a step for contacting the exhaust gas of an internal combustion engine containing sulfur oxide with a sulfate absorbent, said sulfate absorbent absorbing sulfur oxide in the exhaust gas and releasing the absorbed sulfur oxide when the concentration of oxygen in the exhaust gas becomes low;

a step for determining whether the amount of sulfur oxide absorbed by the sulfate absorbent has reached a predetermined value; and a step for lowering the concentration of oxygen in the exhaust gas when it is determined that the amount of the sulfur oxide absorbed by the sulfate absorbent has reached said predetermined value to, thereby cause the sulfate absorbent to release the absorbed sulfur oxide.

10. A method according to claim 9, further comprising a step for supplying a substance having an affinity for oxygen greater than the affinity of sulfur dioxide for oxygen to the sulfate absorbent when the absorbed sulfur oxide is released from the sulfate absorbent.

11. A method for purifying the exhaust gas of an internal combustion engine containing soot and sulfur oxide comprising:

a step for collecting soot in the exhaust gas of an internal combustion engine;

a step for contacting the exhaust gas after collecting soot with a sulfate absorbent at a temperature lower than a releasing temperature, said sulfate absorbent absorbing sulfur oxide in the exhaust gas when the temperature is lower than said releasing temperature and releasing the absorbed sulfur oxide when the temperature becomes higher than said releasing temperature;

a step for burning the collected soot; and a step for supplying the combustion exhaust gas generated by the combustion of the soot to the sulfate absorbent to cause the sulfate absorbent to release the absorbed sulfur oxide.

12. A method according to claim 11, further comprising a step for supplying a substance having an affinity for oxygen greater than the affinity of sulfur dioxide for oxygen to the sulfate absorbent when the absorbed sulfur oxide is released from the sulfate absorbent.

* * * * *